United States Patent [19]

Hamilton

[11] Patent Number: 5,176,520
[45] Date of Patent: Jan. 5, 1993

[54] COMPUTER ASSISTED INSTRUCTIONAL DELIVERY SYSTEM AND METHOD

[76] Inventor: Eric R. Hamilton, 1427 Madison, Evanston, Ill. 60602

[21] Appl. No.: 510,141

[22] Filed: Apr. 17, 1990

[51] Int. Cl.⁵ .............................................. G09B 3/00
[52] U.S. Cl. .................................. 434/350; 434/307; 434/323; 434/365; 273/434; 358/85; 379/96; 395/927; 364/419
[58] Field of Search ............... 434/307, 350, 336, 365, 434/323, 108, 162; 379/96; 273/629–431, 433, 434; 358/85; 395/927; 364/410, 419

[56] References Cited

U.S. PATENT DOCUMENTS

| | | | |
|---|---|---|---|
| 3,077,038 | 2/1963 | Williams et al. | 35/9 |
| 3,233,346 | 2/1966 | Cornberg | 35/60 |
| 3,401,469 | 9/1968 | Shaver et al. | 35/8 |
| 4,052,798 | 10/1977 | Tomita et al. | 35/9 A |
| 4,486,180 | 12/1984 | Riley | 434/65 |
| 4,538,995 | 9/1985 | Fryer | 434/432 |
| 4,609,358 | 9/1986 | Sangster | 434/350 |
| 4,659,876 | 4/1987 | Sullivan et al. | 379/96 |
| 4,715,818 | 12/1987 | Shapiro et al. | 434/350 |
| 4,759,717 | 7/1988 | LaRochelle et al. | 434/350 |
| 4,785,472 | 11/1988 | Shapiro | 434/307 |
| 4,820,167 | 4/1989 | Nobles et al. | 434/307 |
| 4,846,694 | 7/1989 | Erhardt | 434/365 |
| 5,002,491 | 3/1991 | Abrahamson et al. | 434/350 |
| 5,073,926 | 12/1991 | Suzuki et al. | 379/53 |

OTHER PUBLICATIONS

"The Scribophone: A Graphic Telecommunication System" by L. Kool, Philips Telecommunication Review, vol. 38, No. 1, pp. 7–10, Jan. 1980.

"Audiographic Terminal" by M. Laube, Electrical Communication, vol. 60, No. 1, pp. 45–50, 1986.

*Primary Examiner*—Richard J. Apley
*Assistant Examiner*—Joe H. Cheng
*Attorney, Agent, or Firm*—Welsh & Katz, Ltd.

[57] ABSTRACT

A computer assisted instructional information delivery system having at least two stations. One station for an instructor and one or more stations for students. An interactive monitor is positioned in each station. Each interactive monitor displays instructional information in visual form as inputted by a stylus or light pen on the interactive monitor. A network communication system operated by a central processing unit and corresponding software, communicates the instructional information from the stylus as inputted on one of the interactive monitors and selectively displays the instructional information simultaneously and concurrently onto any or all of the interactive monitors of the stations.

39 Claims, 16 Drawing Sheets

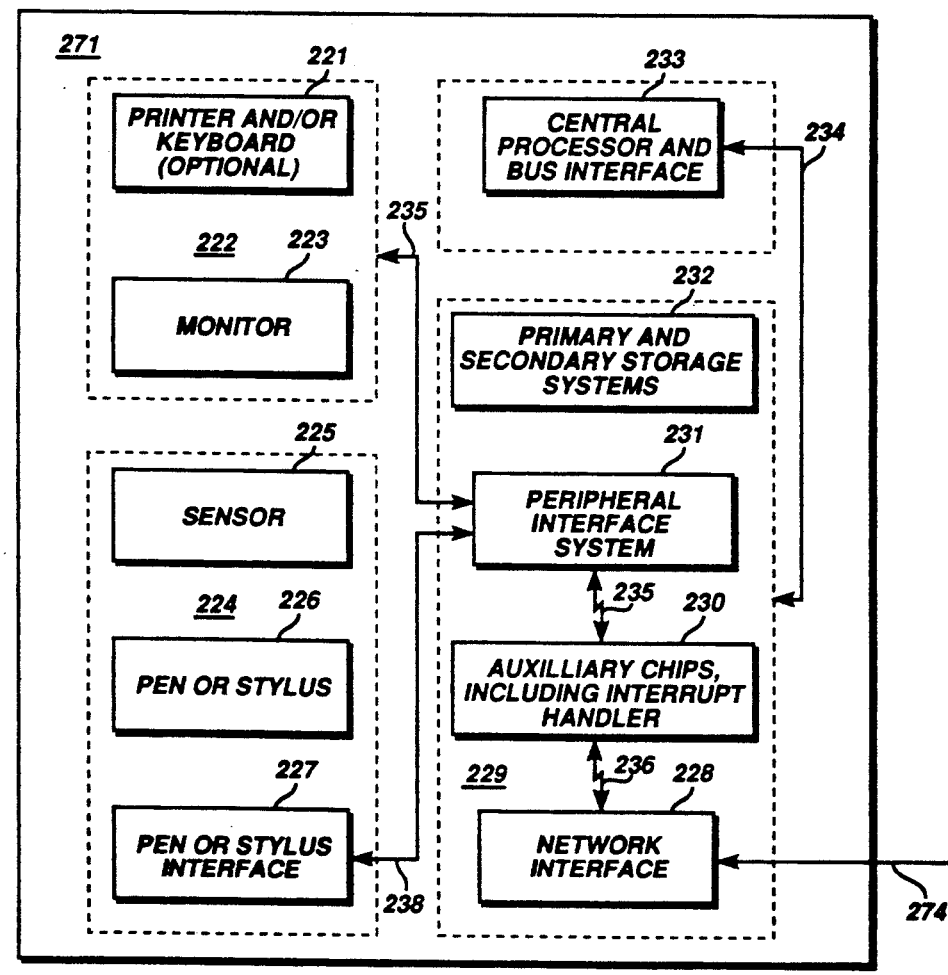

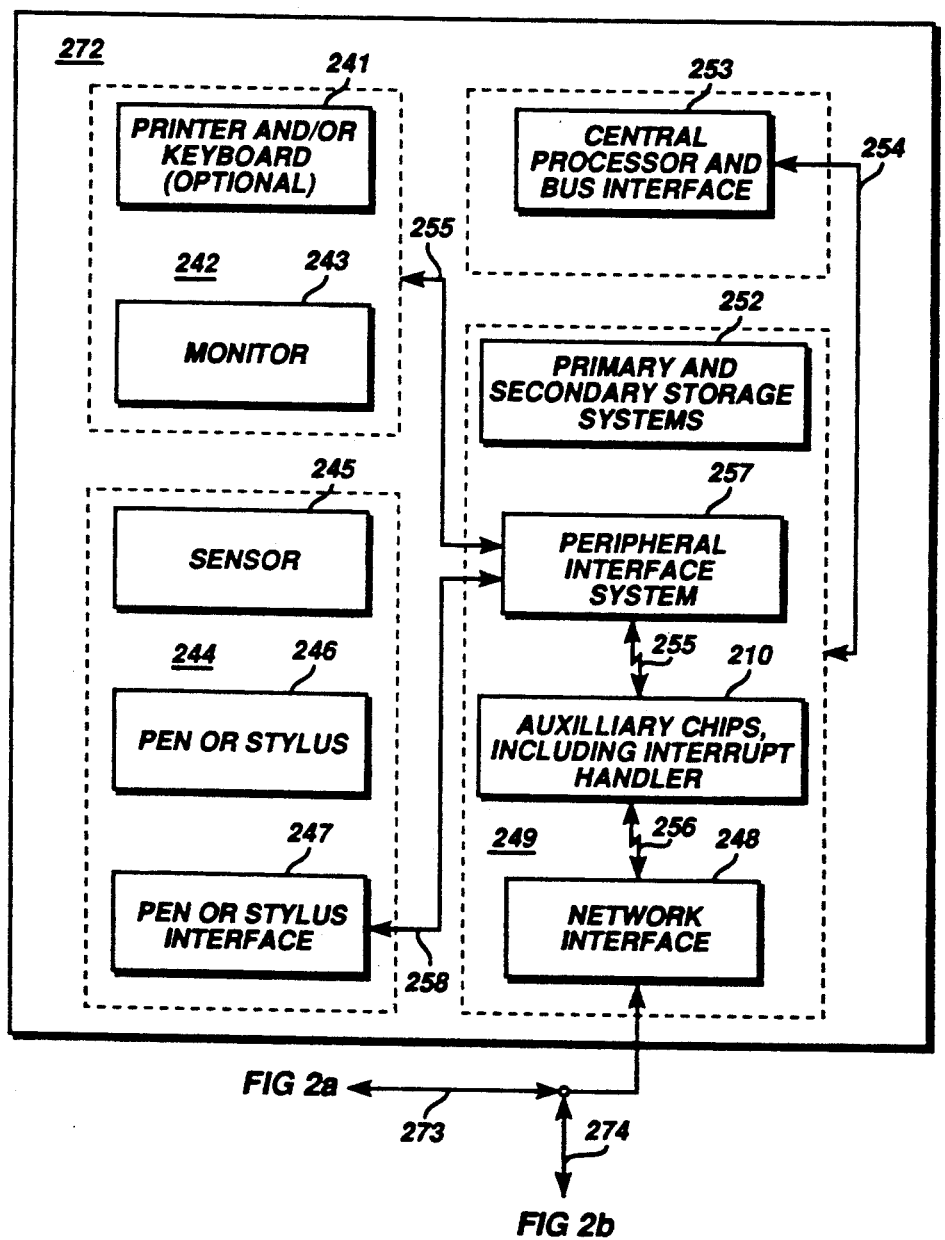

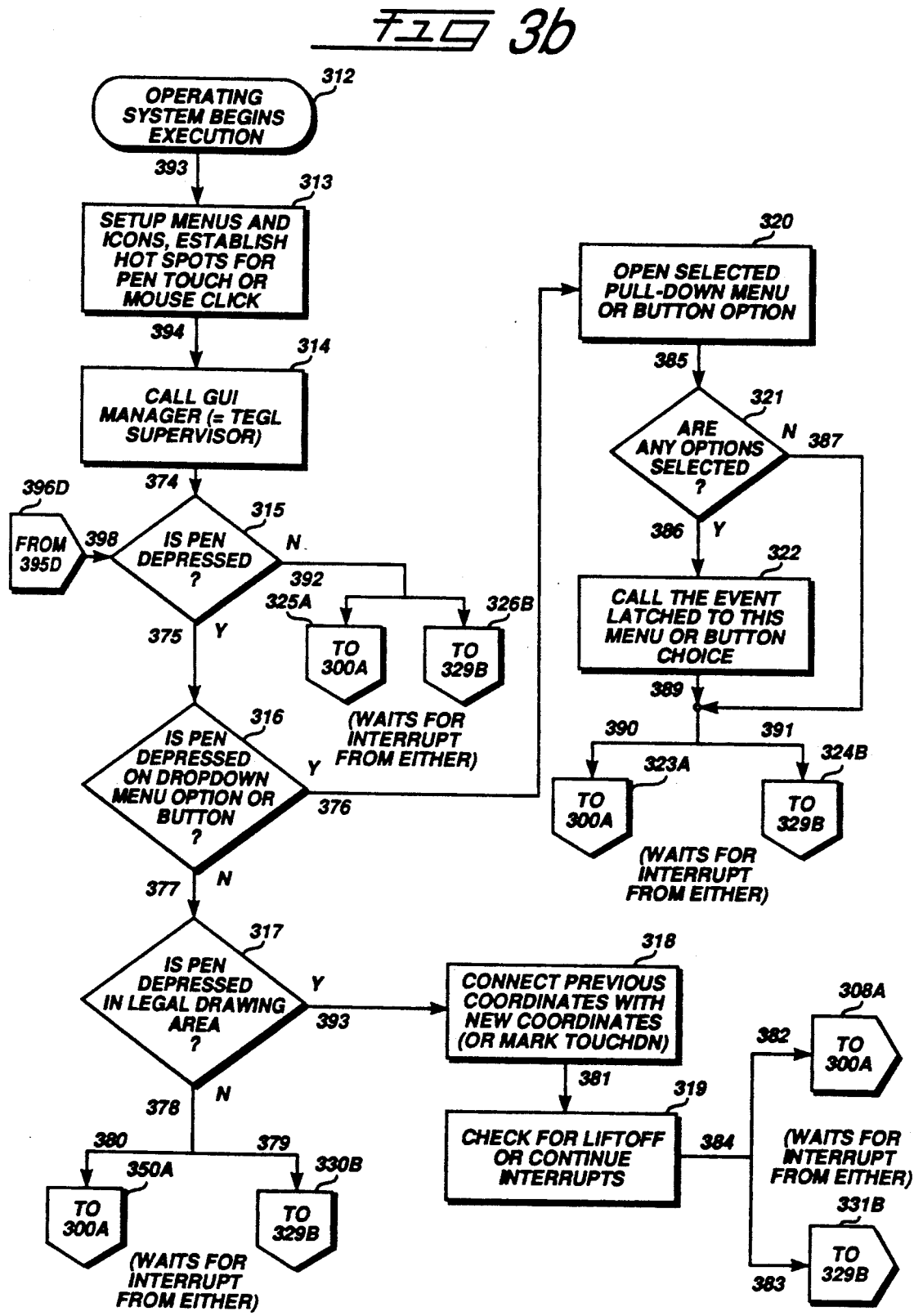

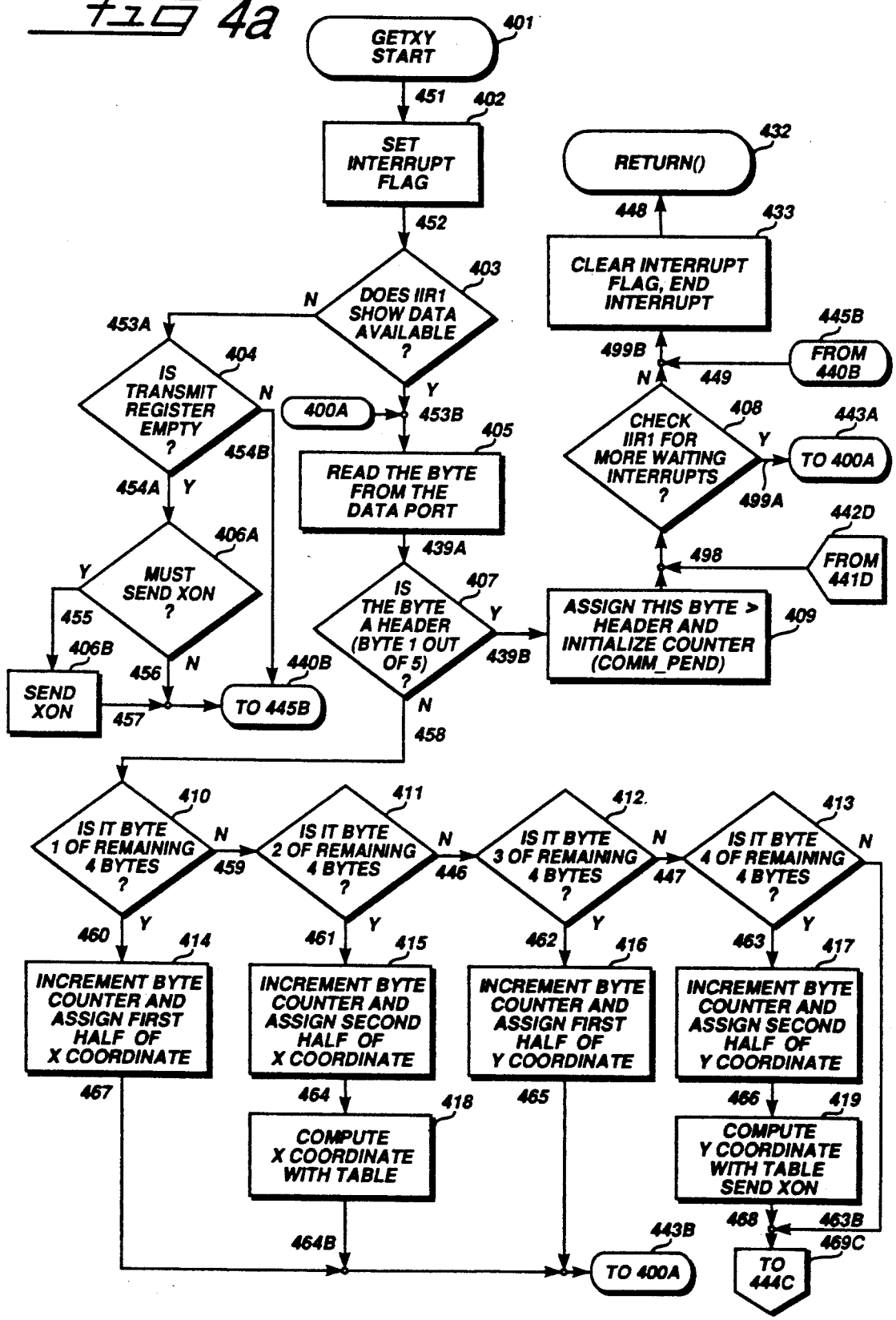

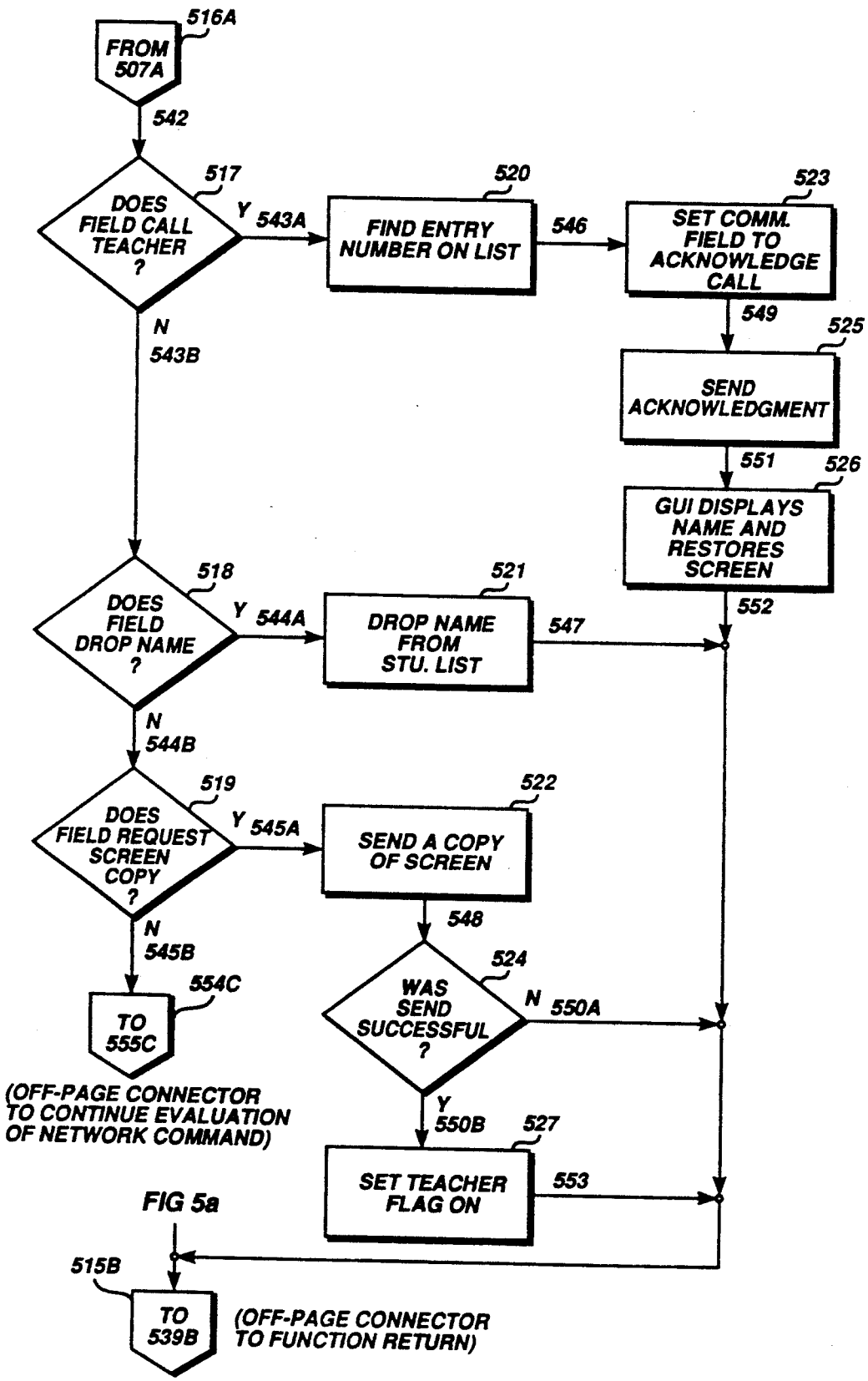

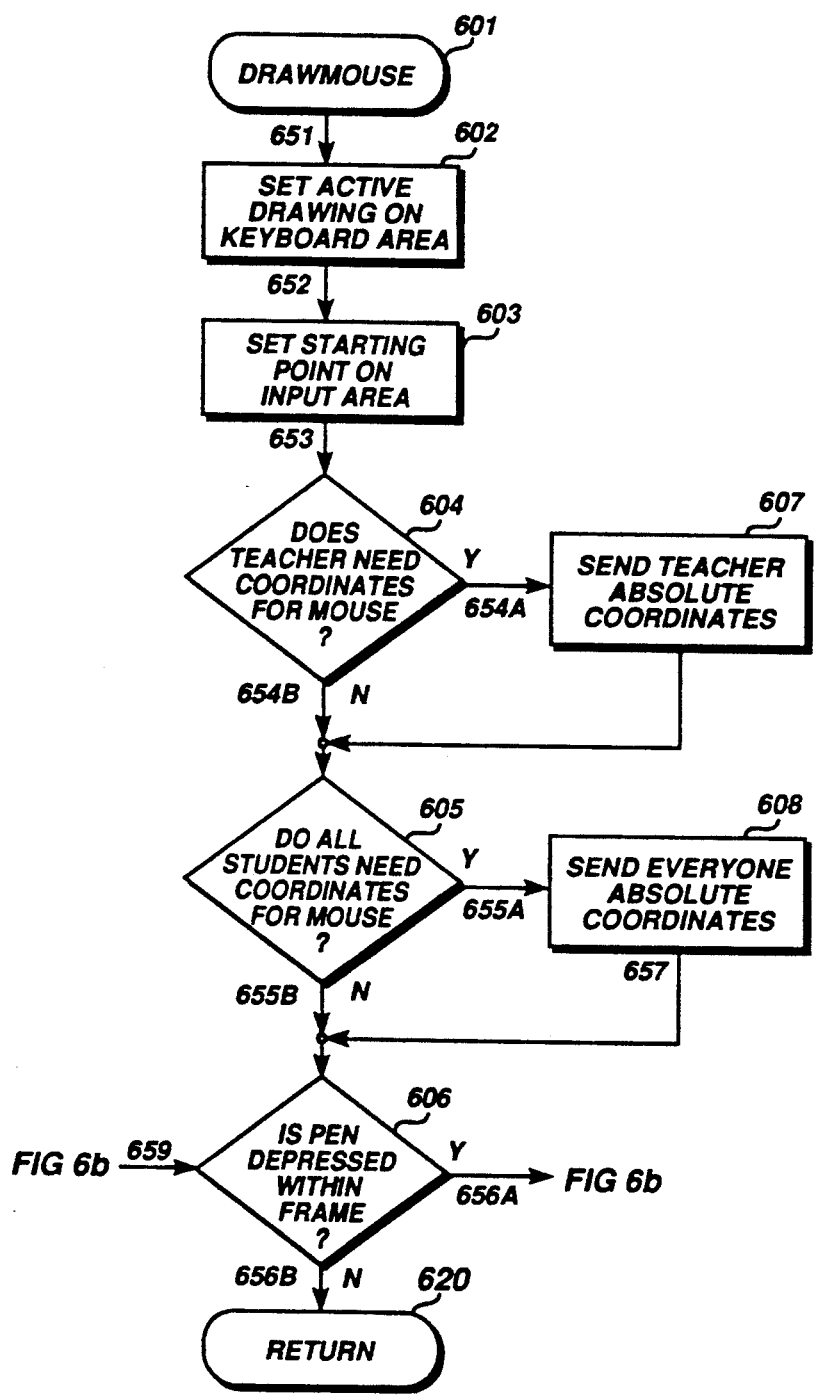

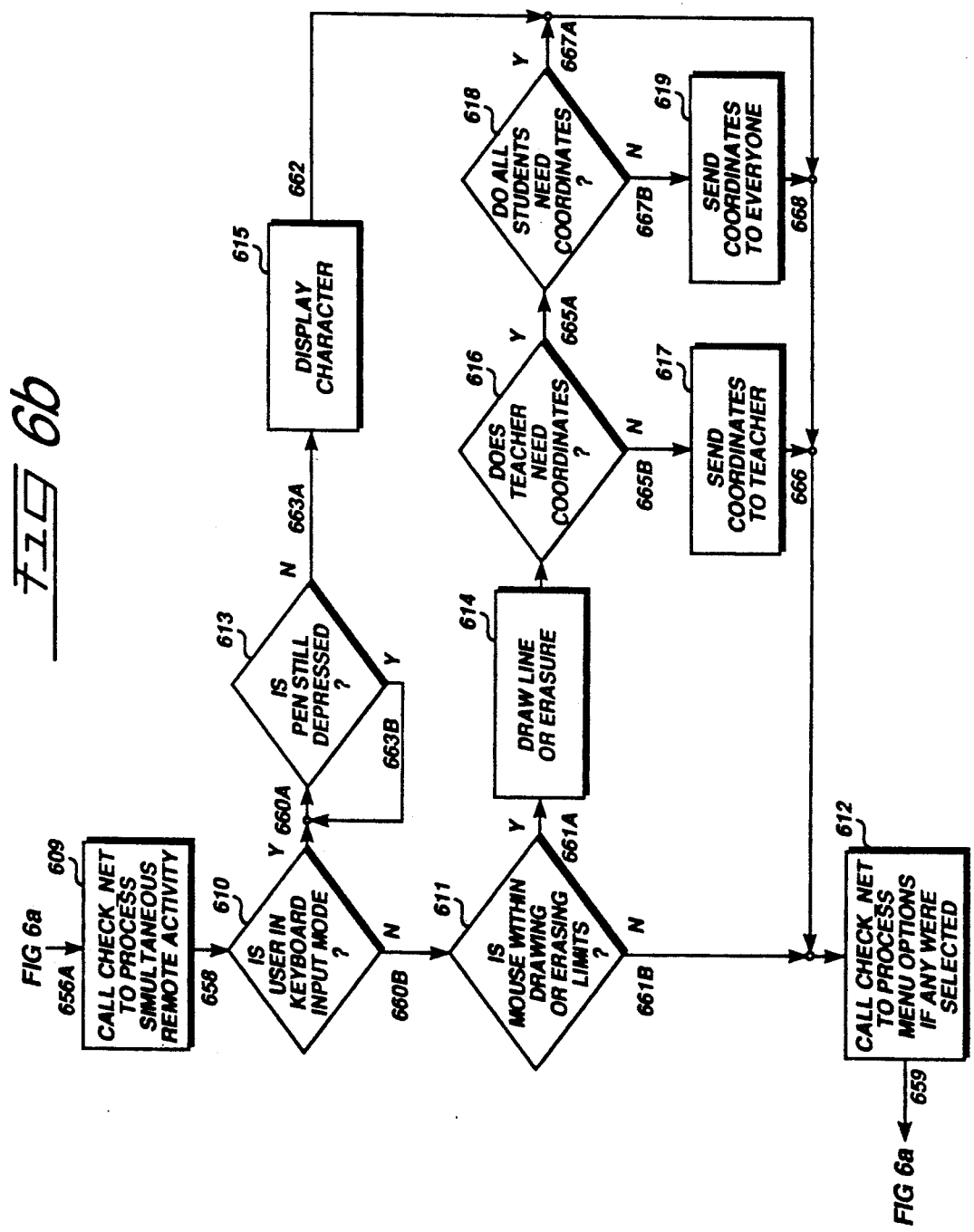

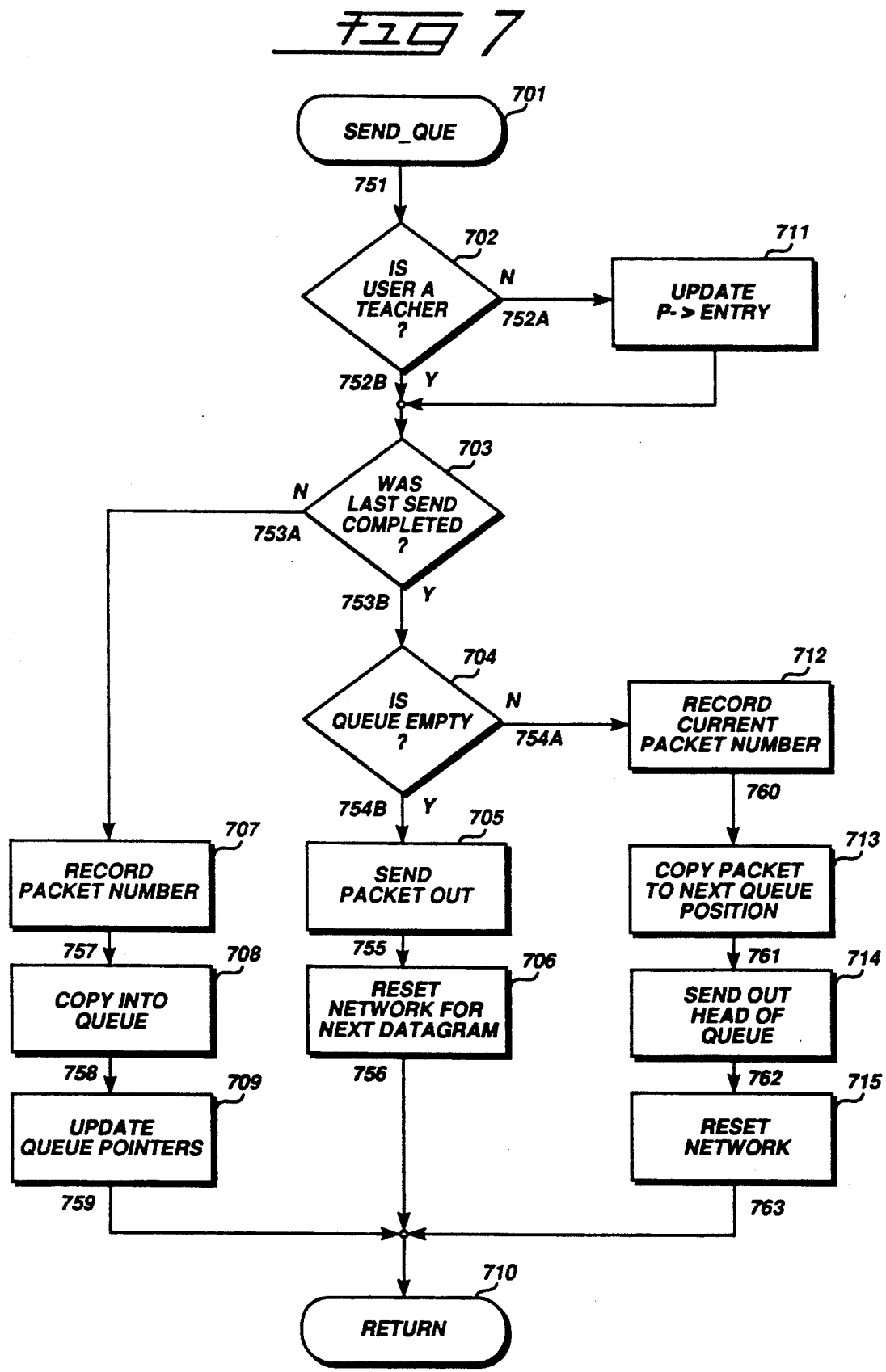

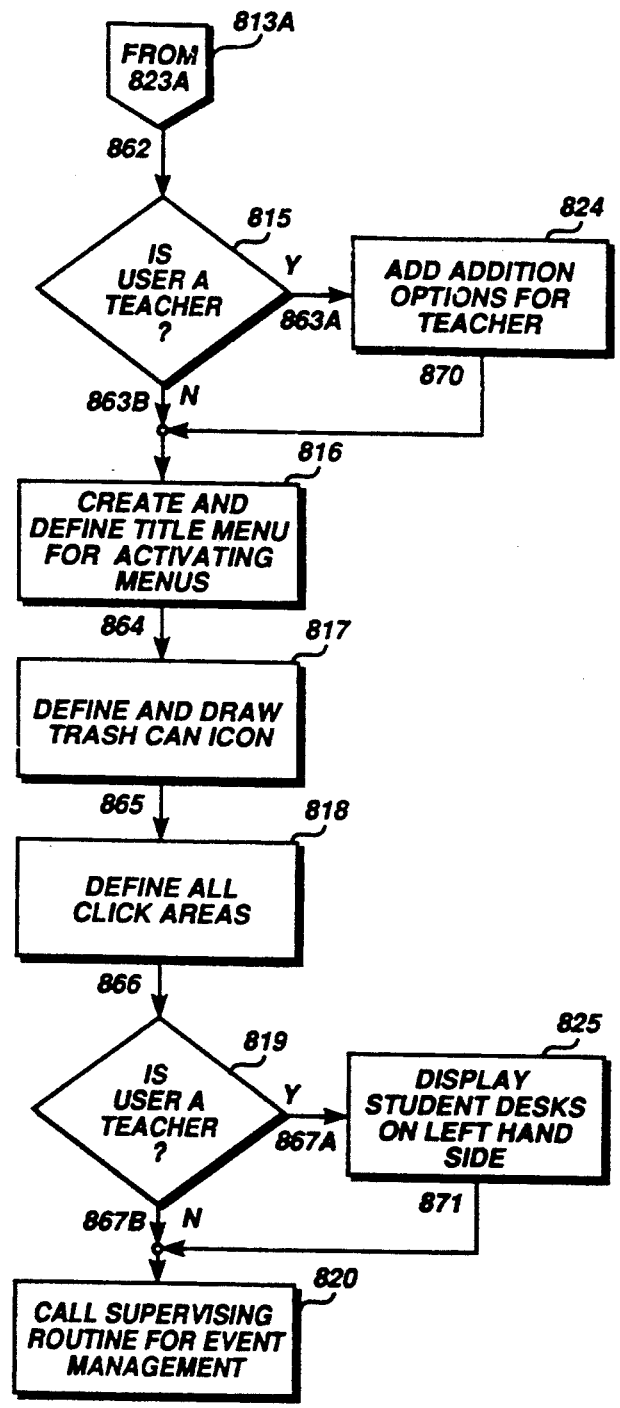

COMPUTER ASSISTED INSTRUCTIONAL DELIVERY SYSTEM AND METHOD

As part of the specification hereto is a Microfilm Appendix as Computer-Output-Microfilm output affixed to 26 paper cards.

This invention relates to a computer-mediated communication system, the primary application of which is intended to be classrooms or other training or learning environments. More particularly, this invention relates to a configuration of computer hardware and software which enables two or more users (typically an instructor and student) at different stations to share what will be called electronic sheets of paper.

BACKGROUND OF THE INVENTION

A genre of training software that simulates simultaneous two-way communication has emerged in recent years. Such software typically involves an operator at one terminal taking control of an application at another station. Although control of the application reverts back and forth between operators at different stations, three critical differences distinguish such systems from the present invention. First, such prior systems always require a basic platform application, such as a word processor or spreadsheet. The present invention does not require such a platform application. Second, the present invention does not involve one operator taking control of an application. Two users may simultaneously control the application. Third, such applications do not contemplate free-hand writing or drawing to simulate paper and pencil writing and drawing as the principal means of effecting the shared communication.

Although some video instructional systems enable teachers to transmit images created by one student to appear at the stations of a full classroom in a single manner similar to this invention, these prior systems do not entail simultaneous and interactive communication between the teacher and student, either on a one to one or one to a selective group.

Prior instruction systems, such as that shown in U.S. Pat. No. 3,401,469 to Shaver and U.S. Pat. No. 4,486,180 to are severely limited in their flexibility and interaction capabilities. In Shaver, the interaction between student and a control center is over different channels in which the instructional material is prepared in advance, unlike the present invention in which the instructional material is constructed extemporaneously. The invention disclosed in Shaver is not interactive, in that the present invention affords the ability for the material being presented to the student to change on the basis of a teacher's response to the student's input. In Riley, no simultaneous and interactive communication is contemplated, because the system is intended for standardized tests. The present invention provides a medium of simultaneously written interactions between teacher and student.

Other known systems involve the use of predefined still video information such as U.S. Pat. No. 4,052,798 to Tomita, et al. The present invention disseminates information interactively by the teacher as the student works. There is no need to predefine information, and it is not "still" in that the video image seen by the student is always subject to change by the teacher.

Many prior systems are not applicable to written textual communication which is the most effective manner to teach grammar or mathematics, etc. U.S. Pat. No. 3,233,346 to Cornberg involves the use of a telephone system for the student to communicate to the teacher while the student views a video display of the teacher. The invention disclosed in Cornberg is severely limiting in that it does not allow one of the most fundamental means of communication, that being the writing mode, in which student and instructor can communicate.

Even currently known software products such as "Carbon Copy" made by Meridien Technology, a subsidiary of Microcom, Inc., do not allow interaction based on extemporaneous freehand input and rely on the use of preexisting application software rather than the application-free context that the present invention provides. Of all known computer assisted instructional systems, none provide interactive freehand input in an application-free context.

Numerous other advantages and features of the invention will become readily apparent from the detailed description of the preferred embodiment of the invention, from the claims, and from the accompanying drawings, in which like numerals are employed to designate like parts throughout the same.

SUMMARY OF THE INVENTION

The invention in its simplest form is a computer assisted instruction system for a classroom which allows a teacher to share an electronic sheet of paper with one or more students in the classroom, enabling both teacher and student to write on the same "sheet" virtually simultaneously from different parts of the room. At her choice and at her pace, the teacher can switch among students, observing and sharing their work space as their needs require.

The inventive concept consists in the preferred embodiment of the following. Each student's desk is equipped with a 14" monitor (i.e. "screen" or "display"). The monitor surface lies flat on the desk, flush with the desk's surface, and it is equipped with an attached stylus that looks much like a fiber-tipped pen, but with a hard tip. The teacher's station is equipped with a monitor as well (and may also be connected to a bank of small monitors). All of the student computers are linked to the teacher's station. As a student physically writes on the surface of his monitor with the stylus, the image that is written not only appears on that student's display, but is also transmitted simultaneously to the teacher's station. The teacher can passively observe the student's work, or actually interact with the student by writing on her own station at the front of the class, with the image moving back to the student on their display. In effect, the teacher and the student are sharing an electronic sheet of paper. Both can actually work with several electronic sheets of paper, and can "shuffle them" as one might shuffle loose pages taken from a notebook. The teacher can transmit the image from one student, to the whole class, or to a subset of the entire class. With a scanner, the teacher can send images from problem sheets, practice sheets, or even tests to all of the students, virtually copying them directly off of paper and onto the students' displays. Students can, when appropriate, get actual printed copies of their work, or save their work from one class to the next. The desk housing the student monitor will include a sliding cover, to protect the monitor when not in use.

If the teacher's station is equipped with a single monitor, she would be able to select which student's work to view just by touching an image (or "icon") on her monitor from the front. Because all student activity is transmitted to the teacher's station as that activity occurs, the image of the newly selected student's work will immediately appear at the teacher's display.

In a mathematics classroom, for example, a teacher and a student may work together on the same problem from different locations within a classroom. The teacher, more particularly, can watch a student work, and jot down suggestions or comments on the student's sheet. The student may similarly pose questions to the teacher.

The teacher may also elect to transmit back to all students simultaneously. For example, if the teacher poses a geometry problem that she transmits to all of the students, she can wait for a few minutes, observing them and helping them as they work, and then send all of them some further information to help in the next step of the problem.

When equipped with a monitor of sufficient resolution, split screen capability, or when equipped with more than one monitor, the teacher may view the work of and communicate with several students simultaneously.

It is an object of this invention to enable a student and a teacher to share an electronic sheet of paper from remote locations, where the term "share" means that both teacher and student may write or draw on that electronic sheet of paper simultaneously from remote locations with the image produced by one appearing on screen of the other or both.

It is further an object of this invention to enable a student and a teacher to share an electronic sheet of paper from remote locations, where the term "share" also means that both teacher and student may type on that paper simultaneously from remote locations with the text produced by one appearing on screen of the other.

It is further an object of the invention that a teacher may monitor the written work of students by electronically selecting which student's paper will appear at the teacher's station. For example, by activating an icon (appearing in the teacher's monitor) corresponding to a particular student, the current image for that student then appears on the teachers monitor, and the teacher and the student may continue to work on the image together.

It is further the object of this invention that the teacher may transmit to a group of two or more individuals the same image, and the teacher would be able to write on his/her screen, with the result appearing simultaneously at all of the stations sharing that image. In fact, an entire group may work on the same electronic sheet simultaneously.

It is yet another object of the invention that students may discretely communicate with teachers by signaling to the teacher in a means that only the teacher and student can see that the student would like to pose a question. The student may jot down questions to the teacher on their display and the teacher's display without the rest of the class being privy to that communication.

The attainment of the foregoing and related objects, advantages, and features of the invention should be more readily apparent to those skilled in the art after review of the following more detailed description of the invention.

BRIEF DESCRIPTION OF THE DRAWINGS

FIGS. 2A-2C represent an overall schematic diagram identifying the hardware components and connections of the present invention.

FIGS. 3A and 3B provide flow diagrams identifying the general operation of the present invention in which FIG. 3A emphasizes the three communication systems (from the pen, from the network, and to the network), and FIG. 3B depicts the background operation, primarily of the graphical user interface (GUI).

FIGS. 4A and 4B depict in flow chart form the specific flow of operations of the first communication system (from the pen).

FIGS. 5A-5C depict in flow chart form the actual content of the second and third communication systems (to and from the network).

FIGS. 6A-6B depict in diagram form the principal routine that integrates the first communication system with the second and third communication systems.

FIG. 7 depicts in diagram form how the implementation of the present invention manages network transmissions as they are requested in rapid succession.

FIGS. 8A-8B depict in diagram form the source file SLATE.C, which includes the start-up main function, and the initialization of the system until the program is taken over by the graphical user interface (GUI).

BRIEF DESCRIPTION OF THE TABLES

Tables 1 and 2 each list the source code routines and .C files of the present invention, identifying in both Tables the page number in the Microfilm Appendix of each routine or file. Table 1 lists the routines and files in order of page number, and Table 2 lists the routines and files in alphabetical order.

Figure 3A:
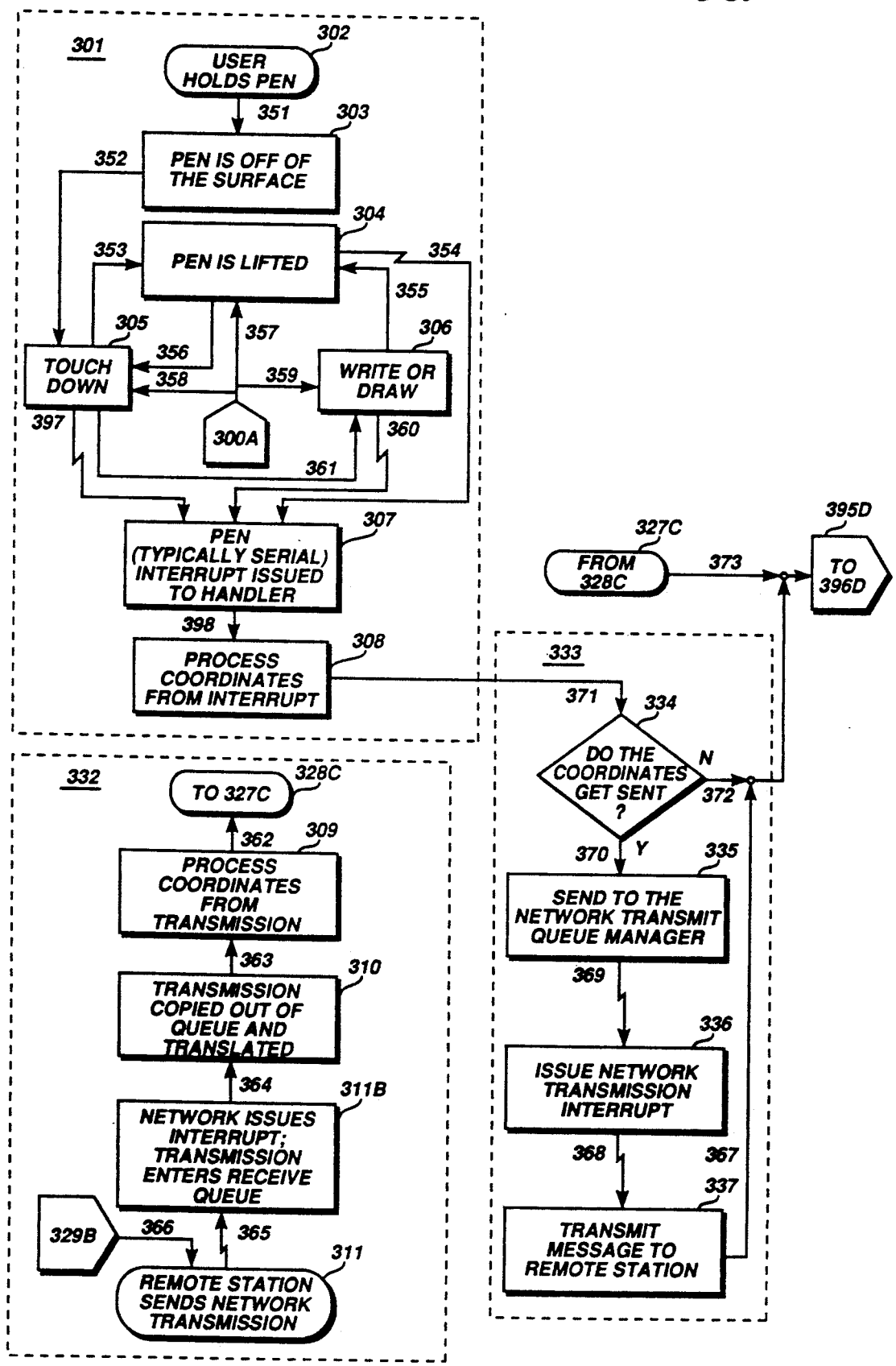

Table 3 identifies key routines as they correspond to the processes depicted in FIGS. 3A and 3B.

The Microfilm Appendix includes two documents. The first, pages H1-H20, provides the actual list for the project (.PRJ) file and header (.H) files in the current implementation of the invention. The second part of the Appendix, pages C1-C133, provides the actual source code listing, arranged in alphabetical order by .C file name, and referenced in Tables 1 through 3.

With the Microfilm Appendix, Version 2.0 of the Turbo C Professional by Borland International of Scotts Valley, Calif., with the LITECOMM standard terminal software package referenced on page C25 of the Microfilm Appendix, and with the screen writing system identified in the next section, this implementation may be readily reconstructed and utilized in performing the novel features of the invention.

DETAILED DESCRIPTION OF THE PREFERRED EMBODIMENT OF THE INVENTION

While the invention is susceptible of embodiment in many different forms, there is shown in the drawings, tables, Microfilm Appendix, and will be described herein in detail, a preferred embodiment of the invention. It should be understood, however, that the present disclosure is to be considered an exemplification of the principles of the invention and is not intended to limit the spirit and scope of the invention and/or claims of the embodiments illustrated.

Figure 1:
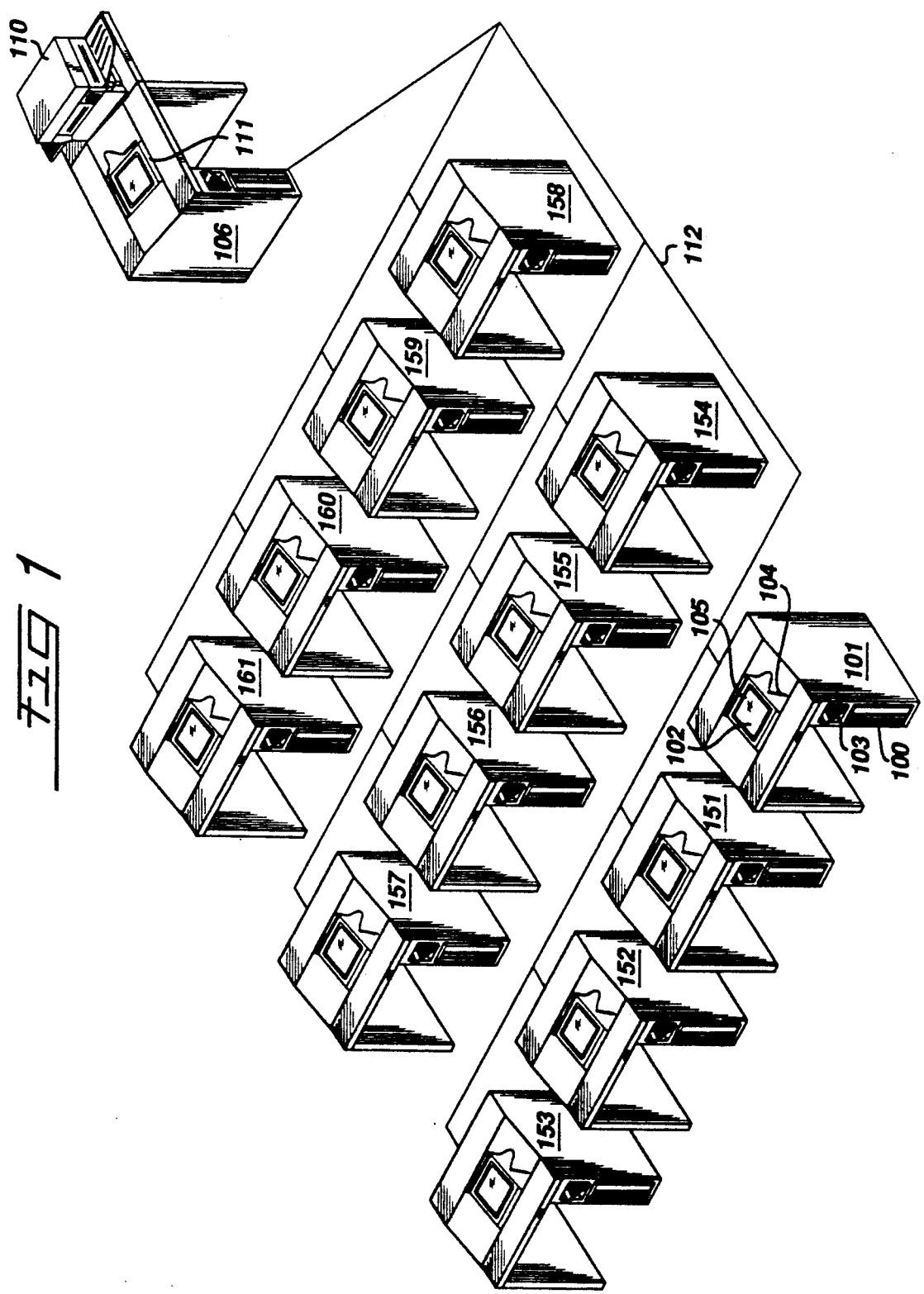
FIG. 1 is an external perspective view of a classroom system in accordance with the present invention.

Turning now to the drawings, more particularly to FIG. 1, there is depicted a facsimile of a classroom with the present invention implemented therein. A representative desk (101) houses the software and computer hardware for either teacher or pupil. A computer (100) is connected to a monitor (102) whose display (e.g., Cathode Ray Tube (CRT) or Liquid Crystal Display Type (LCD)) is flush against the surface of the desk. In the Figure, 102 illustrates the surface of the monitor. An optional keyboard (103) may also be connected to the computer (100). A conventional network bus (112) connects all of the individual desks (101, 106 and 151 through 161). Such a network bus 112 may be effectuated by what is known as serial communication, but more typically will be effective using network protocols that operate at higher speeds (greater than 1.0 megabits per second) than typically available under serial protocols. Commonly used standard protocols for such networks are produced by Novell, Inc. (e.g., "Netware") and by International Business Machines (IBM) (e.g., "NetBIOS"). These conventional networks provide the means for computers to communicate with one another. The software component of the invention may be stored in a disk drive or in "read-only memory" at each station (i.e., inside the computer depicted in 100) or at the central teacher station (106). In the preferred embodiment, the software is stored in a disk drive (not shown) at the teacher station. When the pupil at a student station uses the software, a copy of it is sent over the network bus (112) and stored in the "random access memory" (or "RAM") of the user's computer (101), and is run by that computer.

Figure 2A:
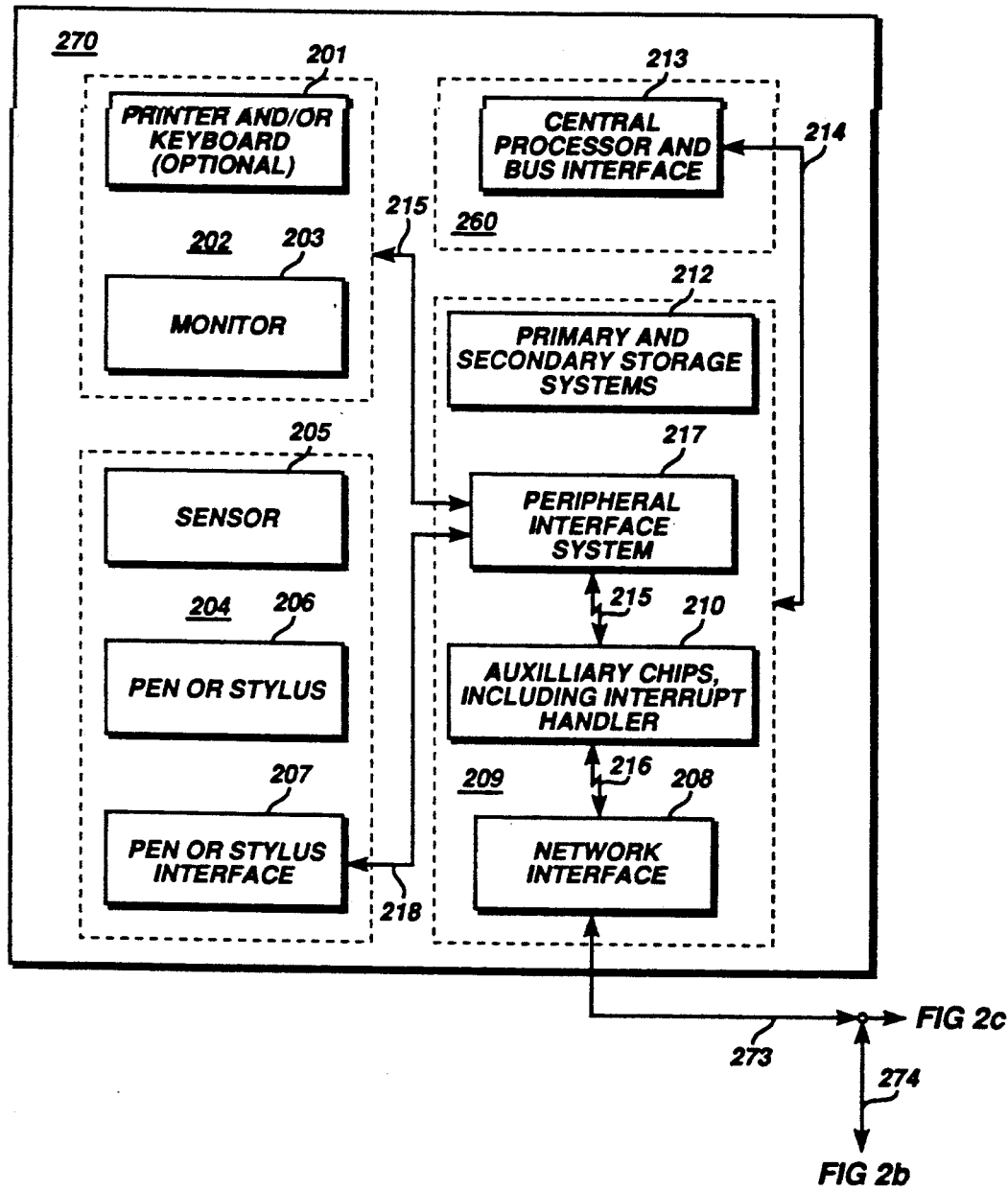

It is possible, in an alternative embodiment, that the student stations (101 and 151-161) do not actually house computers with "central processing units," but instead derive not only their disk storage from the teacher's station (106) but also derive their RAM storage and computing power from the computer at the teacher stations. In this case, each student station would function as a so-called "terminal," and would not include a computer (100). FIGS. 2A-2C, discussed below, provide a schematic of the network bus 112 connections.

Also connected to the computer is a free-style handwriting system (104) to simulate to the user the ability to "write," either on the monitor or on a glass or glass-like sensor plate (105) resting above the monitor, just as one would "write" on a piece of paper with a pen or pencil. Thus, the display from the monitor (102) is directly beneath and is seen through the glass sensor (105). FIG. 1 depicts one possible writing configuration, namely the appearance of the same image on all desks if the teacher transmits the same image to all students. The handwriting system may consist of a corded or cordless light pen, in which the pen translates video signals and is so integrated with an interface card (207 of FIG. 2A) to send the coordinates of the pen's position on the screen to the computer's central processing unit. Alternatively, the monitor itself may be so constructed as to allow the interception of coordinates as a pen-like object moves across its surface, as done by so-called touch screens. Finally, the system may also consist of a pen-like object and glass plate or glass-like plate, positioned directly above the monitor's surface, which are interfaced with the hardware in such a way that as the stylus moves across the surface of the plate, coordinate positions are relayed to the computer.

The preferred embodiment implementation, however, does not involve a light pen or touch screen. Instead, as mentioned, a sensor plate (105) is mounted above the monitor (102), and it is the combination of the sensor plate and stylus, rather than monitor and light pen, that produces the signals.

The housing and computer for the teacher's station (106) may be physically identical to that of any individual student station, although it is likely that a teacher's station may have an optional printer attachment (110). Any student station may also have such an optional printer attachment.

The teacher's display may also, at the teacher's option, include "icons" (111) appearing within the display. An "icon" is a small graphic symbol which, when referenced by the user, provides the user with access to the information or processes that the symbol represents. Under this implementation, each student at stations 101 and 151 through 161 are represented by a separate icon. When the teacher touches the screen where an icon for a student appears, the teacher and that student can begin hand-written screen-sharing communication. That is, both may write (using the pen system (104)) at his or her own station, and the image created by the writing of each user appears not only at that user's station, but at the other user's station as well.

FIGS. 2A-2C more fully depict the physical components of the system. In FIGS. 2A-2C, three separate and identical user or student/teacher stations are depicted (270, 271, 272). Only one of these stations 270 will be described herein, it being understood that the other two stations are identical (except as noted). The central processing unit with bus interface (213) is connected via a data bus (214) to the computer's remaining systems (209), including storage (212), (i.e., primary storage, or "RAM"; secondary storage, such as disk drive; or "read-only memory" ("ROM")), peripheral interface (217) (e.g., serial and parallel ports), auxiliary chips (210) (such as the standard "8259" interrupt controller, which prioritizes external interrupts (such as issued by a serial interface) to a central processing unit, and the network interface (208), which provides the computer with the physical means to communicate with other stations over the network bus. The central processing unit with bus interface (213) and communication lines to other components (212, 217, 210, 208), and internal communications (215 and 216) comprise the computer system (100) of FIG. 1.

Under the preferred embodiment implementation, the computer (comprised of blocks 260 and 209) may involve an IBM-compatible system with a conventional Intel 80386 processor (included as part of 213), with a standard interrupt controller (included in 217), serial port (included in 210), and "Invisible Network" Novell NetBIOS-compatible network system (with interface card depicted as 208) from Invisible Software, Inc., Foster City, Calif. In the preferred embodiment, the central processing unit (253) at the teacher's station is significantly enhanced by the processing power of at least an 80386 chip with the capacity to access large blocks of random-access memory (greater than 640 kilobytes) as well as the capacity to use large blocks of RAM as a high speed substitute for secondary (e.g., disk) storage, although a less sophisticated chip (e.g., 8088) may be used at student stations.

The handwriting system is shown here as 204, consisting of the pen or stylus (206), (104 of FIG. 1), a sensor (205) that rests above the monitor (203), and the interface system (207) (out of view in FIG. 1, but housed in the desk (101)) that translates the pen strokes on the sensor into event codes and coordinate positions for transmission via a data bus (218) back to the peripheral interface system. Under the preferred embodiment implementation, this transmission occurs via serial cabling. Such a handwriting system (204) is available as the Screenwriter TM system, from Microtouch Systems, Inc., 55 Jonspin Road, Wilmington, Mass. 01887. When a system such as the Screenwriter is the input medium for the three-communication system depicted in 301, 332, and 333 of FIG. 3A and the graphical user interface depicted in FIG. 3B, the shared screen writing of this invention is effected. The individual stations are connected to one another via the network cabling (273, 274).

FIGS. 2A-2C depict two student stations (270 and 271) and one teacher station (272). Student station 271 and teacher station 272 include the same components (except for the aforementioned central processor unit 253 at the teacher's station.) Thus, identifiers 221 through 238 correspond identically with identifiers 201 through 218, as do identifiers 241 through 258.

FIG. 3A identifies the three concurrently operating communication systems at a single user's station (either teacher or student) under this implementation of the invention, shown as enclosures within the three dotted boxes (301, 332, 333) in FIG. 3A. The first (301) involves the free-hand pen input, from a user. The second (332) involves transmissions sent over the network to the user from other stations. The third (333) involves transmissions sent from this station over the network to other stations.

Table 3 identifies the key functions in the source code for each process in both FIGS. 3A and 3B, with a page number reference to the Microfilm Appendix. (FIGS. 4-7 diagram the most important of these functions with respect to the critical simultaneous communication systems that effect a shared writing surface.)

FIG. 3B identifies the "background" system, including the graphical user interface (GUI), that displays to the user the user's input or the input from other stations in the network.

The implementation begins execution with initialization of all of the communication systems, the GUI management system, and other features of the execution environment (312). (The GUI system in this implementation was developed by Richard Tom of TEGL Systems, Inc., Vancouver, BC, as a graphical toolbox. Source code for the TEGL portion of the implementation, as it has been adapted for use here, appears between pages C74 and C133 of the Microfilm Appendix.)

The software application itself then proceeds as a continuous interaction of four systems: the three communication systems (from the pen to the software application (301), from the software application out to other stations in the network (333), and to the software application from other stations in the network (332)) and the GUI management system (FIG. 3B).

At the beginning of the program, the pen is assumed to be off of the input surface (303). The user holding the pen (302) can keep the pen off the surface, touch the pen on the surface (305), or move the pen over the surface in a writing or drawing fashion (306). From either a touch down or a moving position, the user may lift the pen off of the surface (304). An interrupt is issued whenever the pen's status changes (353, 357 and 355 lead to interrupt 354; 352, 358, and 356 lead to interrupt 397; 359 and 361 lead to interrupt 360). The interrupt handler receives the interrupt and begins processing five bytes of information from it: the command field, and two coordinates for each of the x- and y- coordinates identifying the location of the pen on the sensor when the interrupt occurred. The principal routine to perform the interrupt handling is int_getxy, diagrammed in FIGS. 4A and 4B, and beginning on line 72 of page C35 of the Microfilm Appendix.

The lower right dotted rectangle (333) of FIG. 3A depicts the second of the three concurrent communication systems. As coordinates are processed by the int_getxy routine, an evaluation of whether the input is to be transmitted is made at lines 88 through 94 of page C36 of the Microfilm Appendix, corresponding to 334 of FIG. 3A. If the data is to be transmitted, it is sent to the sending queue for transmission to appropriate other stations via the send_que routine (line 70 of page C31 of the Microfilm Appendix). This communication system involves transmission of a data packet which includes the coordinate and event information. (FIG. 7 diagrams the send_que routine.)

Figure 5A:
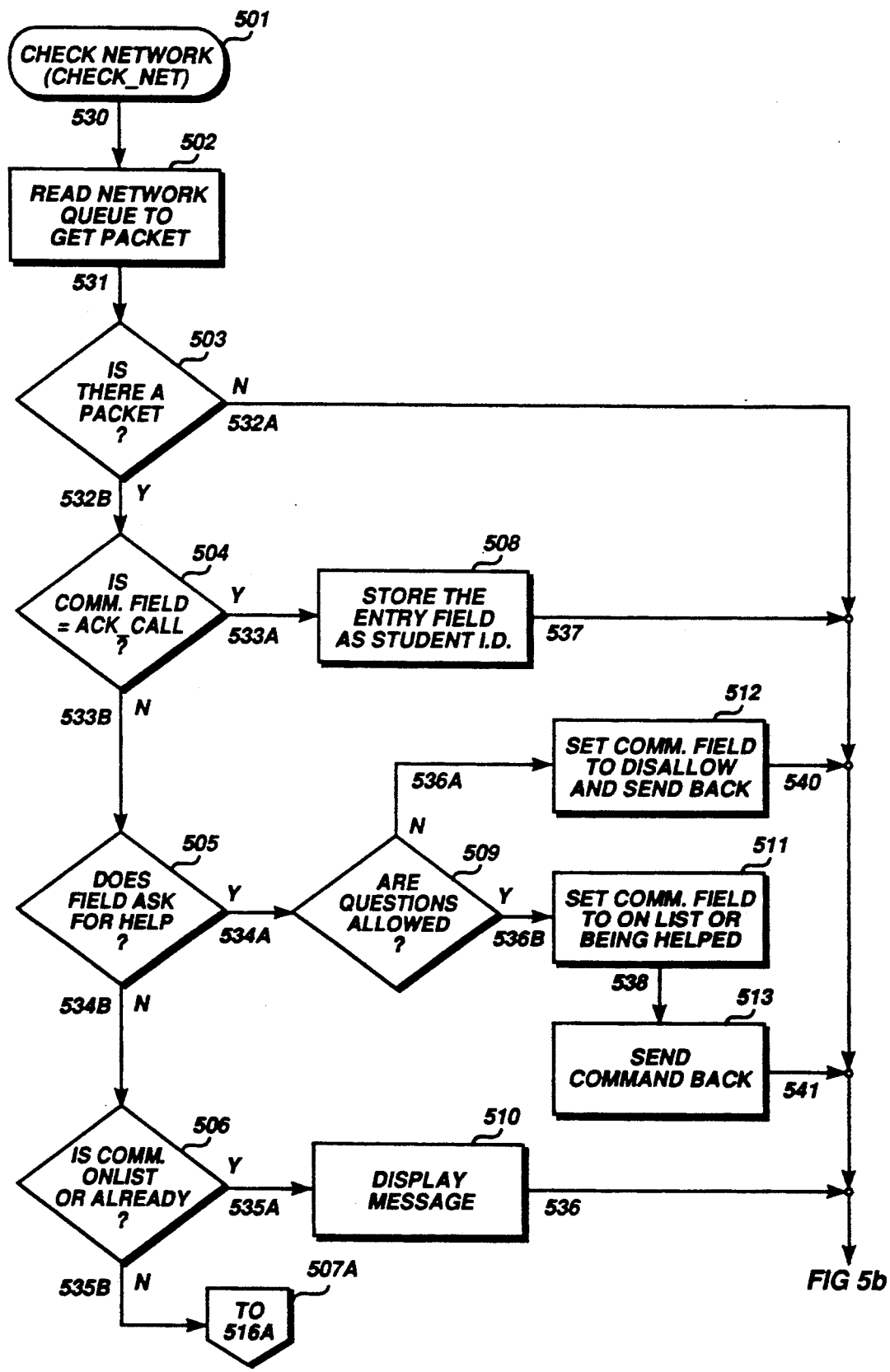
Figure 5C:
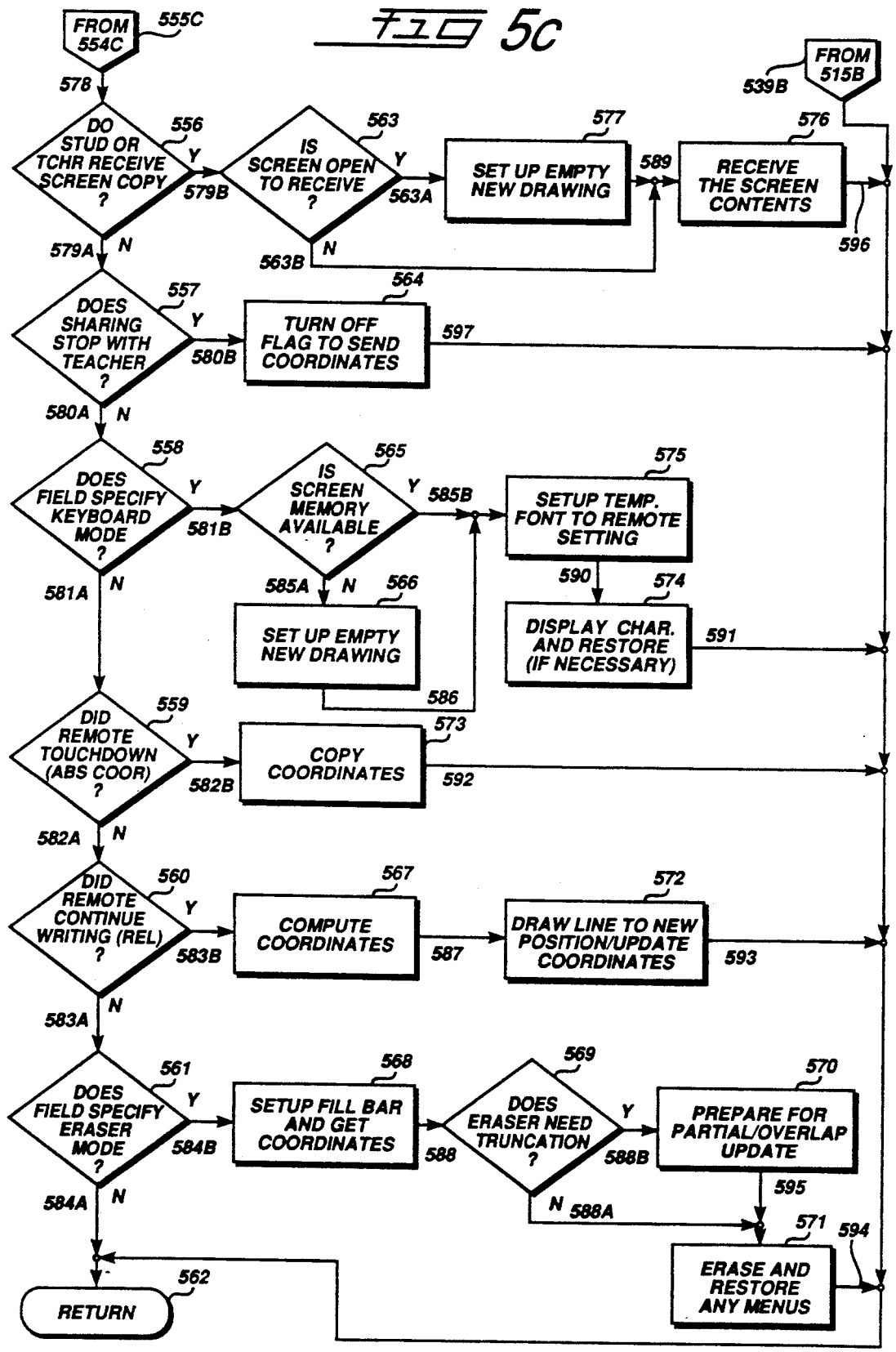

The lower left dotted rectangle (332) of FIG. 3A depicts the third communication system, namely incoming transmissions. Because transmission speeds over a network (e.g., over Ethernet) are typically faster than the signals from an input device (e.g., under serial protocols), it is actually possible that of two or more individuals sharing the same screen, a "remote" writer's input may appear on the screen more quickly than the "local" writer. The software application processes incoming coordinates from the pen or from remote sites on an interrupt-management basis, and gives to users the appearance of simultaneity. (FIGS. 5A-5C depict the network communication process in greater detail.)

A remote station sends a network transmission with a packet containing coordinate and event information (311, 365) to the user's station. When the packet arrives at the local station, a network interrupt is issued (311B), which, when serviced, places the packet onto a receiving queue (rec_int, on line 8 of page C31 of the Microfilm Appendix).

The data is copied out of the queue (310) and the coordinate values are computed (309) for use as if they were derived from the input device. Thus on-page connector C (328C) leads to on-page connector C (327C) for processing by the GUI (FIG. 3B) on the same path (off-page connectors D (395D in FIG. 3A and 396D in FIG. 3B)) as the pen input (372 and 367). Once coordinates are available from either a network transmission or from an interrupt from the pen, different GUI functions, especially including drawmouse (page C69 in the Microfilm Appendix and more fully diagrammed in FIGS. 6A-6B), process the coordinates to update to user's viewing area. Thus, if the pen (at either the local or remote station) is depressed (315), the location of the depressed area must be evaluated. If the (local) user is attempting to access a "drop-down" menu or is trying to access an option by touching a "button" on the screen (316) (for example, to change the pen from writing mode to erasing mode), the choice is processed (320-321). If the (local or remote) user is instead continuously depressing the pen in a writing area (317), a line is drawn to connect the location of that depression with the most previous one (318). (These "lines" are extremely short, and give the appearance of smooth, continuous drawing or writing.) As the drawmouse diagram of FIGS. 6A-6B note, this "connecting the dots" activity may constitute erasing parts of the screen if the user is in the erasure mode. If the depression of the pen (317) is actually a "touch down" rather than a "continued draw," the coordinates are stored for subsequent connection. The drawing routine then checks to determine whether the (local or remote) user is continuing to write or has lifted the pen off of the surface of the screen.

Off-page connectors A (308A, 323A, 325A, and 350A in FIG. 3B) represent a flow of control back to off-page connector A in FIG. 3A (300A), to the routines that evaluate the status of the pen. However, this flow of control only occurs if pen activity has produced an interrupt of the GUI to indicate that the pen status or pen position has changed. Off-page connectors B (326B, 330B, 324B, and 331B in FIG. 3B) represent a similar flow of control to off-page connector B in FIG. 3A (329B) to determine whether network transmissions are available, although the GUI checks in a systematic fashion (with the check_net function of FIGS. 5A-5C) to determine whether network interrupts have left any coordinate data from a remote user available in the network "queue."

In FIGS. 3A and 3B, a number of marked connections identify the sequence of the aforementioned operations and evaluation of command field. These marked connections include 351-353, 355-359, 361-364, 366-367, 370-382, 384-387, 389-394, and 397-398. All of these connections represent standard flow of control pathways.

Figure 4B:
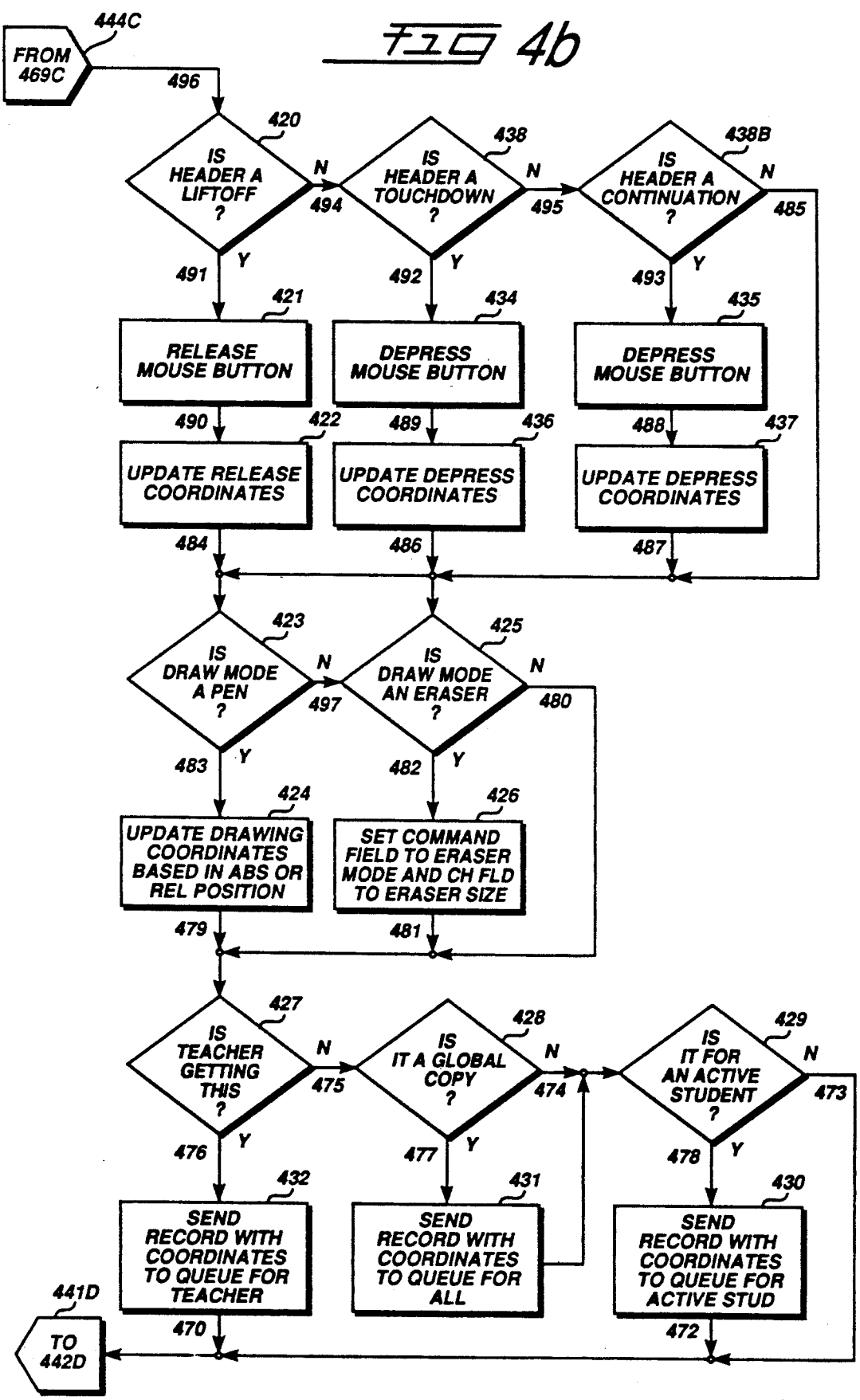

FIGS. 4A and 4B diagram the function int_getxy (beginning on line 61 of page C35 of the Microfilm Appendix), which processes interrupts issued by the pen interface (207 of FIG. 2A, and 354, 360, 397 of FIG. 3A). Significant portions of this routine are written as in-line assembler (lines 74-95 of page C35, lines 99-102 of page C36, and lines 1-7 of page C37 of the Microfilm Appendix) to simplify the view of the register-level activity of this function. The function (401) begins by enabling the type of maskable interrupt issued by the interface (402). The communications register that identifies whether serial data has arrived and is waiting to be latched from an input port is tested (403) for the availability of a incoming data. If not (453A), the transmit register is tested (404). If not empty, the function begins to exit by jumping (454B) to the lines which will clear the interrupt flag and exit the function. If the transmit register is empty, (454A), another test is required for this implementation for whether an XON must be issued prior to exit (406A). If not (456), the function jumps (457) to the exit lines, as it does after issuing an XON (406B) if one is necessary (455). The purpose of the int_getxy function, is to process a positive result from the (403) test for incoming data. If data is available (453B), it is read from the input port (405) and examined.

If the byte falls within a specified range, it is the first incoming byte (or header byte (407)) of a sequence of five bytes from the pen interface which identify one of three pen events (lift up, touch down, or continue draw) and the coordinate position of the reported event. If the byte is a header (439B), the reported event is recorded and a counter for the remaining four bytes is initialized (409). The communications register to signal that another byte of data has arrived and is ready to be latched is tested (408). If the result is positive (499A), flow of control returns to the code which reads the data (405), shown in the diagram by on-page connector A (443A) to on-page connector A (400A). A negative result to 408 begins the process of exiting the function (499B).

With the counter initialized, the subsequent four bytes are evaluated and processed at 410 through 413. Each time one of the four bytes is processed, the counter is incremented and the byte is stored for translation to screen-mappable x- and y-coordinates (414-417). The pen interface under this implementation identifies a point on a 1024 × 1024 point grid on the sensor (205 of FIG. 2A). The screen resolution may be 640 × 480. The first two bytes (410 and 411) report the horizontal position, and the second two bytes (412 and 413) report the vertical position Thus, after the second byte is processed, the x-coordinate for the screen can be computed (418), and the y-coordinate for the screen can be computed (419) after the fourth byte. An XON is also issued at 419 to signify that the full five byte expected transmission has been received.

Once the header and the coordinates have been latched and initially processed, they are further processed so that the GUI can update the display. This involves testing the header byte for the three possible events (lift-off, touch down, or continued draw) (420, 438, and 438B).

The GUI is an adaptation of "mouse" routines, and the mouse terminology of those routines is retained in this source code. A mouse is a hand-held device connected to a computer to provide a user with a flexible means of changing the location of the "currently active" portion of a screen, or to choose to carry out commands available by pressing or "clicking" the buttons on the mouse. A "mouse routine" is one which translates activity with the mouse, such as moving it, clicking a button, or releasing a button, into the action intended to follow as a result of that activity Thus, a lift-off corresponds to a mouse button release (421) whereas a touch down or a continued draw correspond to depressing a mouse button (434 and 435). Once the "release" or "depress" flags are set, the "release" or "depress" variables are updated with the new coordinates (422, 436, and 437), before an evaluation of whether the pen event involves a draw (423) or an erasure (425).

In either event, the coordinates are recorded for possible transmission to other stations in the network (424 and 426), to which they are sent via the send_que function (432, 431, 430), diagrammed in FIG. 7. FIG. 4B diagrams the testing of the flags to indicate whether a transmission of the header and coordinates should be issued to the teacher, to all of the stations, or to a student station (427-429). FIGS. 4A and 4B, which together diagram the int_getxy function, are joined by the two off-page connectors C (469C in FIG. 4A and 444C in FIG. 4B) and by the two off-page connectors D (442D in FIG. 4A and 441D in FIG. 4B.

Once the new coordinates have thus been processed, and the available data register shows no new data, the function is exited. When the GUI detects that the interrupt from the pen to its background activity has produced a flag showing that a "mouse" button is depressed (i.e., that the pen is pressed against the surface of the sensor above the monitor), the GUI calls the "drawmouse" function (page C66 of the Microfilm Appendix that is diagrammed in FIGS. 6A-6B), and the coordinates of the drawing are placed on the screen. It is during the drawmouse function that the check_net function (page 60 of the Microfilm Appendix), diagrammed in FIGS. 5A-5C, is called to see if any network interrupts from a remote station have placed coordinate drawing data from that station to also be included in the drawing on the screen.

The lines in FIGS. 4A and 4B depict the flow of control from one process or test within the function to the next. These lines are referenced by identifiers 439A, 439B, 445 through 446, 448 through 449, 451 through 468, and 470 through 499.

FIGS. 5A–5C together diagram the flow of control for the check_net function, on pages C69–C70 of the Microfilm Appendix. The check net function is the communication handler that translates network communications between stations into information that the GUI can use to produce the shared screen effect of the invention. This function runs in the GUI background (FIG. 3B) and is also called at various points when update values are expected from network interrupts. In particular, check_net is called by the drawmouse function as shown in FIG. 7.

The check_net function begins by reading the network queue (502) via the read_que function (page C31 of the Microfilm Appendix) to determine if any transmissions await processing. A transmission, except when involving a full screen of graphical data, occurs in increments of PACKETs, defined on line 50 of page H10 of the Microfilm Appendix. When presented in upper case letters, PACKET refers to a specific variable to be transmitted over the network. A packet includes a one byte command field, a name field to transmit a student's name, a table entry field to identify a student by code, a character field when passing typed characters (or the eraser radius during erasures), a font identifier, and the x and y coordinates identifying the location of the event being shared by the screens.

The check_net function is the conversation between stations. The "first word" of every communication between stations is the command field, and it identifies how the receiving station should interpret the "rest of the conversation." The current implementation at the source level allows these command fields: ACK_CALL, ASK_HELP, ON_LIST, BEING_HELPED, NOT_ALLOW, CALL_TEACHER, DROP_NAME, SEND_COPY, STOP_SEND, SCREEN_COPY, KBRD_INPUT, ABS (for touch down of the pen at remote station), REL (to signify continued writing after a touch down), and ERASER.

The polling (503) to determine whether an interrupt was previously issued resulting a PACKET being stored on the queue is effected by returning a zero if there was none (532A) (which simply produces a return to the calling function) or a non-zero (i.e., "true" or "yes" condition) pointer to a copy of the PACKET (532B), at which point a case statement evaluates the command field of the PACKET. (Path 532A leads to an exit diagrammed in FIG. 5B (515B) where the exit path continues to off-page connector 539B in FIG. 5C, leading to a return (562). The exit path in the diagram leads through off-page connectors B (515B in FIG. 5B and 539B in FIG. 5C.)) The flow-of-control arrows 533B, 534B, 535B, 542, 543B, 544B, 545B, 578, 579A, 580A, 581A, 582A, 583A, and 584A of FIGS. 5A–5C all signify that the test to identify the command in the PACKET has not yet succeeded. Only student stations under this implementation will receive the ACK_CALL command (504, line 51 of page C69 of the Microfilm Appendix), signifying that the teacher has acknowledged that the student has logged onto the system and has returned an identifier for an internal table at the teacher station for that student. The student station then stores the identifier (508) and the routine then exits (i.e., flow of control returns to the instruction immediately after the one that called the check_net function.) Only teacher stations will receive requests for help commands (505, line 55 of page C69 of the Microfilm Appendix) which are followed by examining whether questions are being allowed (509). If not (536A), a transmission is sent back to the student with the command field set to DISALLOW. Otherwise, the command field is set (511) to tell the student s/he is on the list for help (line 61 of page C69 of the Microfilm Appendix) or to remind the student s/he is already being helped (line 69 of page C69), and that command is sent back to the student (513) prior to exit (541). Thus, these newly set command fields (to signify "no help allowed," "already being helped," or "on list to be helped") are transmitted back to the student (512 or 513, leading to connector 517B, where the exit path continues to connector 539B in FIG. 5C, leading to a return (562)). If the student station receives one of these responses (506), the appropriate message is displayed (510), and the function exits (536).

When a new station physically logs onto the network at the time it is booted, an identifier is issued by the network software. When a student first logs onto this software implementation, it issues a call to the teacher for an identifier. This is the identifier the student stores (508) when it receives an acknowledgement (504) of this call to the teacher. The call itself (517, line 91 of page C69 of the Microfilm Appendix) is received by the teacher's station, which looks up the student's identifier issued by the network (520), and returns it to the student (525) with the command field of the outgoing PACKET set to ACK_CALL (523). Next, the GUI displays the name on the teacher's screen before restoring the screen to its appearance before the name display (526). Control then returns to the calling function (552).

A DROP_NAME command field (518, line 2 of page C70 of the Microfilm Appendix) will result when the student logs off the system; when the teacher's station receives a PACKET with this command field, the student's name is dropped (521) from the table position it took when the teacher's station received the first PACKET from the student, containing the CALL_TEACHER command (517). Once the name is dropped, control returns to the calling function (547).

If the command field requests a copy of the screen 519, (line 5 of page C70 of the Microfilm Appendix), a large transmission of a window takes place (522) from student to teacher (in contrast to the small transmission of a PACKET). Under this implementation, only teachers can request screens, and, if transmission of the screen (522) is successful (524), a flag at the student's station is turned on (527) to signify that all subsequent events are to be transmitted. This flag is evaluated by the drawmouse function, diagrammed in FIG. 6A (604).

Continuing from off-page connectors C (554C in FIG. 5B and 555C in FIG. 5C), if either a student or teacher receives a full copy of a remote screen, a PACKET is sent with the SCREEN_COPY value in the command field (556, line 12 of page C70 of the Microfilm Appendix). The receiving station must have screen space available (563). If such space is not available, an empty screen is created (577) and the screen can be received (576) before the function is exited.

If the teacher terminates communication with a student, the teacher's station will send a STOP_SEND PACKET to the student 557, (line 9 of page C70 of the Microfilm Appendix) which will turn off the "send to teacher flag" (564) prior to exiting (597).

Under this implementation, with an optional keyboard, users can type on one another's screen simultaneously. If the PACKET specifies keyboard input (KBRD_INPUT) (558, line 18 of page C70 of the Microfilm Appendix) and an available drawing area (565), a temporary font value is recorded (575) from the PACKET (implying that two different fonts, one for each person sharing the drawing or typing area may be used simultaneously). The PACKET includes a character value for transmission in keyboard mode, which is then displayed by the GUI (574), which will also restore any drop-down menu information that is sharing the same space as the keystroke from the remote station (also 574). (If necessary, a drawing area is established to receive the input (566)).

Of the aforementioned commands, only SEND_COPY, SCREEN_COPY, and KBRD_INPUT produce changes in the user's writing area. The next two command fields, ABS and REL, produce the actual shared drawing on a screen. When an ABS is received (559, line 35 of page C70 of the Microfilm Appendix), the user at the sending station has just pressed the pen to the sensor (305 of FIG. 3A), and the absolute coordinates of the touch down are recorded (573) so that, unless the pen is immediately lifted, a connection can be made between the point at these absolute coordinates and the point at the coordinates where the next interrupt is issued by the pen's serial interface at the remote station. At that next interrupt, a new PACKET is sent by the remote station, with the command field set to REL (560, line 40 of page C70 of the Microfilm Appendix), and the relative position from the last touch down or drawing interrupt (whichever is more recent) is included in the PACKET. A line is drawn (572) from the point at the last pair of coordinates to the point at this new set of coordinates. The value of the coordinates is then saved for use when a subsequent PACKET arrives with the command field set to REL. Control then returns to the calling function (593).

The final communication mode that occurs under this implementation is the ERASER mode. If the command specifies that the remote sharing user is using an eraser (561, line 63 of page C70 of the Microfilm Appendix), a white "fillbar" (i.e., a small rectangle of blank space that can be positioned anywhere on a screen to "white out" or "erase" anything that is at that position) is set up by the GUI, which also determines whether the eraser, perhaps being at the edge of the drawing area, must be truncated (508) (and so it prepares to restore information that overlaps with the eraser (570)). The White bar (i.e., eraser) is then moved across the drawing area by the GUI (571). The size of the white bar is passed in the PACKET through the character field, which is otherwise used for transmitting keystrokes in keyboard mode (574). The center of the eraser is given by the x and y coordinates passed by the PACKET. After the GUI places the eraser with a white fillbar over the desired area, and restores any menu areas with which it overlapped, control passes back to the calling function (594).

In FIGS. 5A-5C, the lines identify the sequence of the aforementioned operations and evaluation of command field. These marked connections include all of connections from 530 through 538, 540 through 553, and 578 through 597.

FIGS. 6A-6B diagram the drawmouse function, as it appears beginning on line 65 of page C66 of the Microfilm Appendix. The function (601) begins with GUI calls (lines 72 through 77 on page C66 of the Microfilm Appendix) which set up the active drawing area. The current active point is set to the x- and y- coordinates (603, line 78 of page C66 of the Microfilm Appendix) originally assigned in the int_getxy function which processes interrupts from the pen interface. Thus, the x- and y- coordinates that are critical to this drawmouse routine are those assigned in the int_getxy function on lines 53-54, 62-63 and 70-71 on page C36 of the Microfilm Appendix), and these are the same coordinates within this function on the aforementioned line 78 of page C66 of the Microfilm Appendix. If a mouse rather than a pen is the input device and if the coordinates are to be sent to the teacher (604) or to the entire class (605), a call to the function send_pt is issued with either the TEACHER or ALL_STUDENTS as a destination parameter. send_pt is a short function (line 3 on page C32 of the Microfilm Appendix) which prepares the data for transmission through the network via the send_que function which it calls (FIG. 7).

The evaluation of whether the pen is depressed within the "frame" or "drawing area" leads to, on positive result, the execution of a loop beginning its iteration at 656A and ending its iteration at 659. The loop stops executing once the pen is no longer being depressed within the frame. The most important points in the loop are the check_net calls (609 and 612, diagrammed in FIGS. 5A-5C) to determine whether a transmission should be processed, and the draw line (or erasure) instructions at 614.

One of the most important features of this invention involves effecting simultaneous shared drawing. The draw line instruction within this loop (614) connects points whose coordinates were produced after the pen interface interrupts the application with pen signals. This draw line instruction appears on line 29 of page C67 of the Microfilm Appendix. Within the same loop, the check_net function is given two opportunities (609 and 612) to draw on the screen, corresponding to 572 of FIG. 5C and to line 62 of page C70. Within a high speed loop which captures incoming coordinate data generated by both the serial (local) or network (remote) interrupts, points can be displayed to effect the simultaneous and shared drawing.

After the initial check_net call (609) to process simultaneous remote activity, the local user's mode is evaluated as either keyboard input (610) or drawing or erasure (611) mode. If the user is in keyboard mode, the function waits for the pen to be lifted from the sensor (613). When the pen is being depressed, the user is identifying the location on the sensor where typed input should appear. Thus, once the pen is released (and the "mouse_buttons" flag (line 99 of page C66) of the mouse-based GUI is set to zero) the keystroke may be displayed (615) and the iteration of the main loop of this FIG. 7 function may start again, following another check_net call (612) to determine if any remote activity needs to be reported on the local screen.

Similarly, if the user is in a drawing or erasure mode (611), the line is drawn or erasure effected (with a white fillbar) (614). An evaluation of whether the communication is being shared with the teacher (616) (if this is a student station) or with other students (618) (if this is a teacher station) results in those coordinates with destination being sent (if a mouse rather than a pen is used) to the aforementioned sent_pt function (617 and 19), which prepares them for transmission to the appropriate destination via the send_que function diagrammed in FIG. 7. Whether or not the local user is sending data at the time that keyboard, writing, or erasing activity occurs locally, a check_net call is issued (612) to determine if any remote activity needs to be updated on the local screen, before the iteration begins again (606).

All of identifiers 651 through 663B, 665A, 665B, 667A, and 667B refer to lines that depict the flow of control in the drawmouse function. The function is exited (620) when there is no further local or remote mouse activity within the frame or drawing area.

FIG. 7 diagrams the send_que function, as it appears beginning on line 69 of page C31 of the Microfilm Appendix. The send_que issues the Net_Send_Datagram call (page C29 of the Microfilm Appendix) that transfers packet information into a network control block ("ncb") before issuing the NetBIOS(ncb) call (line 11 of page C23 of the Microfilm Appendix) that physically transfers the ncb to a remote station.

The send_que thus manages the traffic of outgoing messages to the network. An evaluation of whether the most previous send was completed (703) is followed, upon positive result, with an evaluation of whether the sending queue is now empty. If not (754A), the packet that accompanied the call to the function is prepared for transmission. The packet is copied into a transmission packet that the aforementioned Net_Send_Datagram receives when it is called to prepare a network control block for transmission via a NetBIOS call (705). The Net_Send_Datagram call also updates the network for the next transmission (706) before the function terminated.

If the evaluation of the most recent transmission (703) shows that it is still in progress, the current packet cannot go out immediately (753A), at which point its identifier is recorded in a queue table (707), the packet is copied into the head of the queue (708) (which, in the terminology of the source code here implies that it will be the "last" out), and the appropriate queue pointer is updated (709).

If the most recent transmission is completed but the queue is not empty (754A), the new packet will still have to enter the queue rather than get sent out right away. The same instructions are followed in this case, with one noted exception: the packet identifier is stored in a queue table (712) and then the packet itself is copied into position (713), as when the packet goes into a queue while another packet is still in transmission (707 and 708). In this case, however, because the most recent transmission is completed, the packet at the "tail" of the queue (i.e., first in line to go out) is transmitted (714) and the network is reset for the next send (715). Thus, transmissions occur if requested when either there is an empty queue (754B) or when a subsequent request occurs (714).

The lines in FIG. 7 depict the flow of control from one process or test within the send_que to the next. These lines are referenced by identifiers 751 through 763. The implementation of this application may be reconstructed using the 29 source or object files identified in the SLATE.PRJ file on page H1 of the Microfilm Appendix. As SLATE.PRJ indicates, the flow of control begins with instructions in the SLATE.C file, which appears beginning on line 100 of page C49 of the Microfilm Appendix.

Figure 8A:
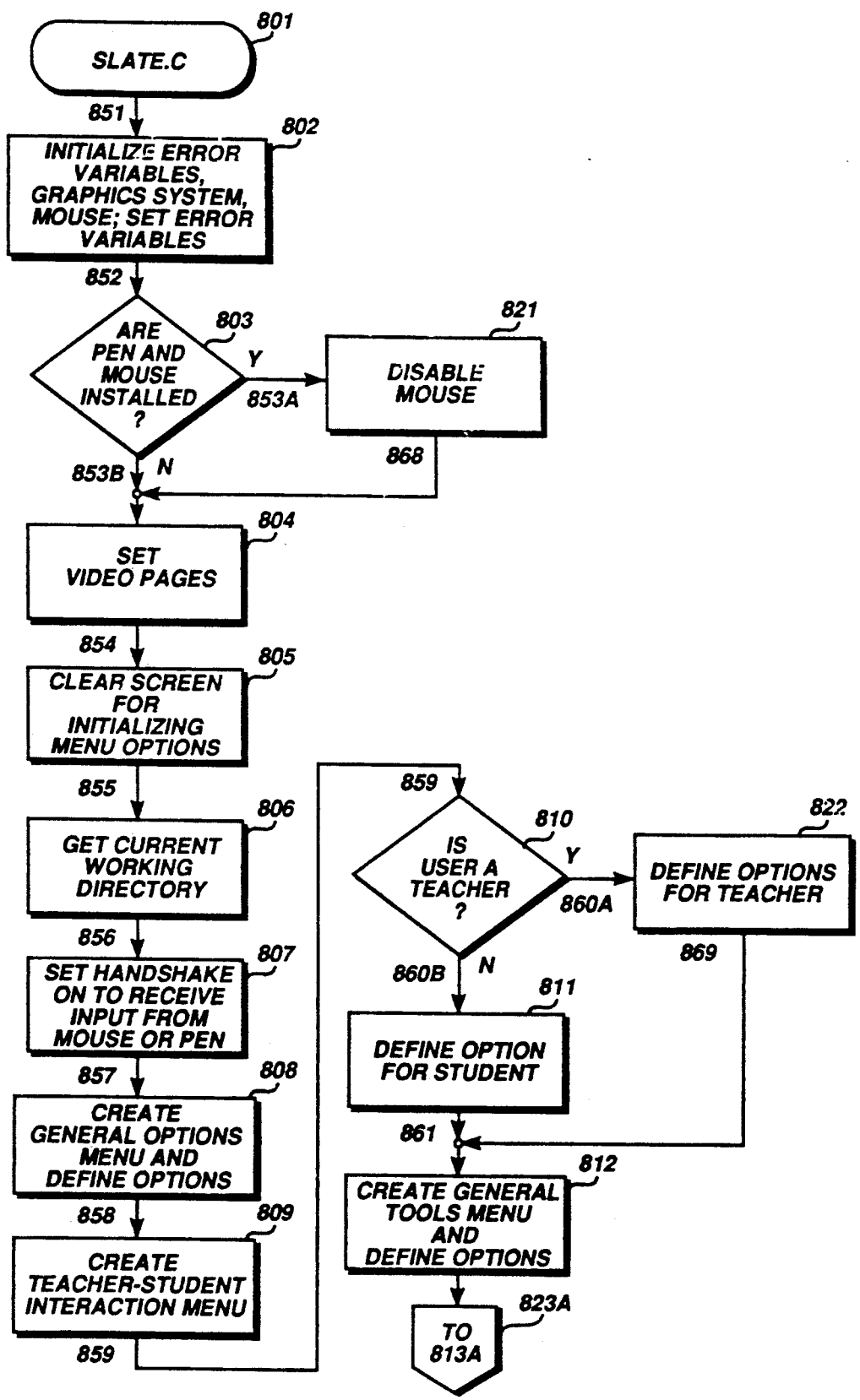

FIGS. 8A-8B diagram the activity within SLATE.C to begin the implementation. The main program appears at line 86 on page C71 of the Microfilm Appendix, and it completes the initialization (802), followed by a determination of whether the input device is a mouse or pen (803) Thus, the implementation may be reconstructed using a mouse instead of a pen. When the pen is used (853B), the mouse is disabled (821). Next, the environment for the application is setup by activities 804 through 809. This application requires extensive video paging which can be implemented in primary storage (804). Other initialization activities include clearing the screen (805), getting the working directory (806), setting up the serial handshake for communication with the pen or mouse (807, on line 8 of page C72 of the Microfilm Appendix), creating the menu that appears at both teacher and student stations (lines 15-26 on page C72 of the Microfilm Appendix), and creating the student-teacher interaction drop-down menus (809) that appear at both teacher and student stations (line 28 of the same page). Next, menu options that are specific to the teacher (822) or student (811) are defined after evaluation of the flag indicates whether the user is a teacher (810). This application anticipates the implementation of a set of auxiliary drawing tools, not unlike commonly available computer graphic paint programs, but also including other features such as a calculator that may be called up into the display. The SLATE.C program creates the common tools menu and defines the available options in (812). Off-page connector 823A continues by repeating the process for the general menu, namely creating teacher-specific (824) or student-specific options depending on the type of user (815). The title bar for the menus is created (816) as is a trash can icon (817). The "click areas" that define what events occur when a given spot on the screen is touched by the pen (or mouse, when a button is depressed) are then initialized (818). Finally, the icons appearing in FIG. 1 (111) that correspond to student desks, are displayed (825) at the teacher's station after the program determines that the user is a teacher (819).

The lines in FIGS. 8A-8B depict the flow of control from one process or test within the SLATE.C modules to the next. These lines are referenced by identifiers 851 through 871.

After the foregoing initialization of GUI, the program then transfers control to the GUI manager, called the "teglsupervisor." The GUI manager effectively updates the screen through the activities diagrammed in FIG. 3B, as the screen is modified by the three concurrent and interrupt-driven communication systems of FIG. 3A.

The foregoing specification describes only the preferred embodiment of the invention as shown. Other embodiments besides the one described above may be articulated as well. The terms and expressions therefore serve only to describe the invention by example only and not to limit the invention. It is expected that others will perceive differences which while differing from the foregoing, do not depart from the spirit and scope of the invention herein described and claimed.

TABLE 1

| C routines and Source File Names (in CAPS) Referenced to and Ordered By Microfilm Page Number | |
|---|---|
| DEBUGUNT.C | 1 |
| showcoordinates | 1 |
| RotateStackImage | 1 |
| showbuttonstatus | 1 |
| EGAGRAPH.C | 2 |
| xorcornerbox | 3 |
| xorbox | 3 |

TABLE 1-continued

C routines and Source File Names (in CAPS) Referenced to and Ordered By Microfilm Page Number

| Routine | Page |
|---|---|
| setapage | 3 |
| setvpage | 3 |
| videopage | 3 |
| flipapage | 3 |
| flipvpage | 3 |
| abort_msg | 4 |
| setgraphicmode | 4 |
| vga640×480×16 | 4 |
| ega640×350×16 | 4 |
| egagraph_terminateexit | 4 |
| init_egagraph | 4 |
| EGAMOUSE.C | 4 |
| key | 7 |
| setshiftkeys | 7 |
| deletecapturekey | 7 |
| addcapturekey | 7 |
| teglreadkey | 7 |
| teglkeypressed | 8 |
| setmousehotspot | 8 |
| getmousesensitivity | 8 |
| setmousesensitivity | 8 |
| hidemouse | 8 |
| setmouseposition | 8 |
| cursorshape | 8 |
| showmouse | 9 |
| mouseposition | 9 |
| kbmouse | 9 |
| getbuttonpressinfo | 12 |
| getbuttonreleaseinfo | 12 |
| clearbuttoninfo | 12 |
| setmousecolor | 13 |
| controlbreakhandler | 13 |
| timerhandler | 13 |
| egamouse_terminateexit | 13 |
| checkparameters | 13 |
| timerswitch | 14 |
| swaptimerout | 14 |
| swaptimerin | 14 |
| swapegamouseoff | 14 |
| swapegamouseon | 14 |
| settimerstart | 14 |
| droptimercount | 14 |
| resettimerflag | 15 |
| setkeyboardmouse | 15 |
| setkbsteps | 15 |
| getkbsteps | 15 |
| setmouseminmax | 15 |
| frozenmouse | 15 |
| switch_t | 15 |
| ega_overlap | 15 |
| overlaps | 16 |
| freezemouse | 16 |
| unfreezemouse | 16 |
| init_egamouse | 16 |
| EMS.C | 16 |
| EMSPagesAvailable | 17 |
| AllocateExpandedMemoryPages | 17 |
| MapExpandedMemoryPages | 17 |
| GetPageFrameBaseAddress | 17 |
| DeallocateExpandedMemoryPages | 17 |
| GetVersionNumber | 17 |
| GetHandleCountUsed | 17 |
| GetPagesOwnedByHandle | 18 |
| EMSDRIVE.C | 18 |
| emsseek | 18 |
| emsblockwrite | 19 |
| emsblockread | 19 |
| emsclose | 20 |
| FONTTEST.C | 20 |
| closefontwindow | 20 |
| fontname | 20 |
| selectfont | 20 |
| createfontwindow | 21 |
| showonefont | 22 |
| showfonts | 22 |
| HEAPMEM.C | 22 |
| initheap | 22 |
| cgetmem | 22 |
| cmaxavail | 23 |
| showfreelist | 23 |
| fgetmem | 24 |
| cfreemem | 24 |
| LCCIO.C | 25 |
| LCFLSH.C | 25 |
| LCSETUP.C | 25 |
| NETBIOS.C | 25 |
| check_phys | 25 |
| adjust_name | 25 |
| fill_str | 25 |
| Net_Reset | 25 |
| Net_Cancel | 25 |
| Net_Adapter_Status | 26 |
| Net_Identify | 26 |
| Net_Trace | 26 |
| Net_Presence_Test | 26 |
| Net_Add_Name | 26 |
| Net_Add_Group_Name | 26 |
| Net_Del_Name | 26 |
| Net_Find_Name | 27 |
| Net_Call | 27 |
| Net_Listen | 27 |
| Net_Hang_Up | 27 |
| Net_Send | 27 |
| Net_Chain_Send | 28 |
| Net_Incomplete_Send | 28 |
| Net_Receive | 28 |
| Net_Chain_Receive | 28 |
| Net_Receive_Any | 28 |
| Net_Status | 28 |
| Net_Send_Datagram | 29 |
| Net_Low_Overhead_Datagram | 29 |
| Net_Send_Broadcast_Datagram | 29 |
| Net_Receive_Datagram | 29 |
| Net_Receive_Broadcast_Datagrm | 29 |
| NETSTUFF.C | 30 |
| addto_sessionlist | 30 |
| listen_int | 30 |
| rec_int | 31 |
| interrupt send_int | 31 |
| read_que | 31 |
| send_que | 31 |
| send_pt | 32 |
| send_key | 32 |
| send_erase | 32 |
| send_screen | 32 |
| receive_screen | 32 |
| click_student | 33 |
| close_all_sessions | 33 |
| init_net | 33 |
| close_net | 34 |
| PEN_ROUT.C | 35 |
| int_getxy | 35 |
| setup_pen_int | 37 |
| close_pen_int | 37 |
| init_table | 37 |
| comm_gets | 37 |
| comm_puts | 38 |
| lc_getwait | 38 |
| pen_speed | 38 |
| set_pen | 38 |
| wait_ok | 38 |
| calibrate_left | 38 |
| calibrate_right | 39 |
| swapcommon | 39 |
| swapcommoff | 39 |
| SELECTFL.C | 39 |
| insert | 40 |
| addlistentry | 40 |
| getnumberoflogicaldrives | 40 |
| getfilelist | 40 |
| freefilelist | 41 |
| barline | 41 |
| editstring | 41 |
| listfilenames | 43 |
| showdirectorylist | 44 |
| updir | 44 |
| SENSEMS.C | 47 |
| setmousesense | 48 |
| SLATE.C | 49 |
| editchar | 50 |

TABLE 1-continued

C routines and Source File Names (in CAPS)
Referenced to and Ordered By Microfilm Page Number

| Routine | Page |
|---|---|
| debug_info | 53 |
| beep | 53 |
| add_to_queue | 53 |
| drop_from_queue | 54 |
| clear_queue | 54 |
| find_entry | 54 |
| find_in_queue | 54 |
| print_name | 54 |
| update_name | 55 |
| drop_name | 55 |
| trunc_eraser | 55 |
| within | 55 |
| fontnum | 56 |
| askforhelp | 57 |
| viewoptiontoggle | 57 |
| toggle_copy | 57 |
| trashevent | 57 |
| fileselectionoption | 58 |
| definelongbutton | 58 |
| new_drawing | 58 |
| display | 59 |
| read_screen | 59 |
| sgetc | 60 |
| sgetw | 60 |
| save_screen | 60 |
| restore_screen | 61 |
| save_drawing | 62 |
| load_drawing | 63 |
| distrib_stud | 63 |
| distrib_every | 63 |
| deskoption | 63 |
| remove_menu | 64 |
| font_select | 64 |
| eraser_size | 65 |
| set_eraser | 65 |
| set_keyboard | 65 |
| calibrate | 66 |
| drawmouse | 66 |
| drop_fromlist | 67 |
| select_icon | 67 |
| add_to_drawlist | 67 |
| store_drawing | 68 |
| close_drawing | 68 |
| clear_pad | 68 |
| exitoption | 68 |
| infooption | 68 |
| checknet | 69 |
| list_students | 70 |
| initialize | 71 |
| main | 71 |
| TEGL.C | 74 |
| clockupdate1 | 74 |
| clockupdate2 | 74 |
| viewoptiontoggle | 75 |
| creditbox | 75 |
| fileselectionoption | 75 |
| menumouseposition | 76 |
| askmousesense | 76 |
| calldosexec | 76 |
| creditoption | 76 |
| trashevent | 77 |
| trashoption | 77 |
| exitoption | 78 |
| infooption | 78 |
| main | 78 |
| TEGLGRPH.C | 80 |
| drawlongbutton | 80 |
| setshadowcolor | 81 |
| setshadowbordercolor | 81 |
| setshadowfillpattern | 81 |
| setshadowfillstyle | 81 |
| shadowbox | 81 |
| setshadowtexttype | 81 |
| setshadowtextshadow | 81 |
| setshadowtexthighlight | 81 |
| shadowtexthighlightoff | 81 |
| shadowtext | 81 |
| shadowboxtext | 82 |
| setteglbordershow | 82 |
| setteglbackcolor | 82 |
| setteglbordercolor | 82 |
| setteglfillpattern | 82 |
| setteglfillstyle | 82 |
| clearteglscreen | 82 |
| movebox | 83 |
| transformbox | 83 |
| ziptobox | 84 |
| zipfrombox | 84 |
| TEGLICON.C | 84 |
| TEGLMENU.C | 97 |
| positionmenu | 97 |
| togglecheckmark | 97 |
| toggleentrystatus | 97 |
| createoptionmenu | 98 |
| defineoptions | 98 |
| resizeoptionmenu | 98 |
| replaceoptiontext | 99 |
| listoptionmenu | 99 |
| setoptionmenubordercolor | 102 |
| setoptionmenucolors | 102 |
| baroptionmenu | 102 |
| resetoptionmenuevents | 103 |
| defineoptionclickarea | 103 |
| createbarmenu | 104 |
| outbaroption | 104 |
| setbarmenucolor | 104 |
| setbartextcolor | 104 |
| setbarbordercolor | 104 |
| setbarborderoff | 104 |
| setbarfillstyle | 104 |
| setbarshadowtext | 105 |
| TEGLUNIT.C | 105 |
| keybrdnextclick | 105 |
| crclickpress | 106 |
| crclickrelease | 106 |
| pageoutstatus | 107 |
| pageoutfs | 107 |
| pageoutimagestack | 107 |
| pageinfs | 108 |
| useimage | 108 |
| unuseimage | 108 |
| unlockimage | 108 |
| setimagecoordinates | 108 |
| putpartialimage | 108 |
| getpartialimage | 108 |
| linkfs | 109 |
| linkunderfs | 109 |
| unlinkfs | 109 |
| switcht | 109 |
| overlap | 109 |
| overlaparea | 110 |
| insertnewoverlap | 110 |
| mergepartialimage | 112 |
| preparepartialimage | 112 |
| pushimage | 112 |
| popimage | 112 |
| prepareforpartialupdate | 113 |
| prepareforupdate | 113 |
| prepareupdatemsclick | 113 |
| commitupdate | 113 |
| commitimageupdate | 113 |
| hideimage | 113 |
| showimage | 114 |
| rotatestackimage | 114 |
| rotateunderstackimage | 114 |
| moveframe | 115 |
| setmoverestrictions | 116 |
| setframemobility | 116 |
| setmoveframecallproc | 116 |
| movestackimage | 116 |
| dropstackimage | 116 |
| createimagebuffer | 116 |
| freeimagebuffer | 117 |
| dropimagebuffer | 117 |
| commitimageupdate | 117 |
| getfrontimage | 118 |
| getfsimage | 118 |
| clearkeyboardbuf | 118 |
| resetmouseclicks | 118 |
| resetmsclicksense | 119 |

TABLE 1-continued

C routines and Source File Names (in CAPS)
Referenced to and Ordered By Microfilm Page Number

| | |
|---|---|
| resetmsclickcallproc | 119 |
| resetmsclickactive | 119 |
| definemouseclickarea | 119 |
| defineglobalkeyclickarea | 119 |
| definelocalkeyclickarea | 120 |
| dropkeyclick | 120 |
| resetkeyclickcallproc | 121 |
| cursorblock | 121 |
| toggleoptionbar | 121 |
| pressbutton | 121 |
| visualbuttonpress | 122 |
| checkctrlbreak | 123 |
| selectmenu | 123 |
| teglsupervisor | 124 |
| setctrlbreakfs | 124 |
| settimertick | 124 |
| droptimertick | 124 |
| memoryerrormessage | 124 |
| abortdiskerror | 125 |
| init_teglunit | 125 |
| TEGLWRT.C | 125 |
| setproportional | 125 |
| delete | 125 |
| tegltextwidth | 126 |
| outtegltextxy | 126 |
| VIRTDSK.C | 127 |
| vdskshowfreelist | 127 |
| checksum | 127 |
| vdskseek | 127 |
| vdskblockread | 127 |
| vdskblockwrite | 128 |
| vdskgetmem | 128 |
| vdskfreemem | 129 |
| vdskreadheapdata | 129 |
| vdskwriteheapdata | 130 |
| vdskcloseheapfile | 130 |
| VIRTMEM.C | 132 |
| freevirtual | 132 |
| movefromvirtual | 132 |
| disksize | 132 |
| movetovirtual | 133 |

TABLE 2

Alphabetized C routines and Source File Names (in CAPS)
Referenced to Microfilm Page Number

| | |
|---|---|
| abortdiskerror | 125 |
| abort_msg | 4 |
| addcapturekey | 7 |
| addlistentry | 40 |
| addto_sessionlist | 30 |
| add_to_drawlist | 67 |
| add_to_queue | 53 |
| adjust_name | 25 |
| AllocateExpandedMemoryPages | 17 |
| askforhelp | 57 |
| askmousesense | 76 |
| barline | 41 |
| baroptionmenu | 102 |
| beep | 53 |
| calibrate | 66 |
| calibrate_left | 38 |
| calibrate_right | 39 |
| calldosexec | 76 |
| cfreemem | 24 |
| cgetmem | 22 |
| checkctrlbreak | 123 |
| checknet | 69 |
| checkparameters | 13 |
| checksum | 127 |
| check_phys | 25 |
| clearbuttoninfo | 12 |
| clearkeyboardbuf | 118 |
| clearteglscreen | 82 |
| clear_pad | 68 |
| clear_queue | 54 |
| click_student | 33 |
| clockupdate1 | 74 |

TABLE 2-continued

Alphabetized C routines and Source File Names (in CAPS)
Referenced to Microfilm Page Number

| | |
|---|---|
| clockupdate2 | 74 |
| closefontwindow | 20 |
| close_all_sessions | 33 |
| close_drawing | 68 |
| close_net | 34 |
| close_pen_int | 37 |
| cmaxavail | 23 |
| commitimageupdate | 113 |
| commitimageupdate | 117 |
| commitupdate | 113 |
| comm_gets | 37 |
| comm_puts | 38 |
| controlbreakhandler | 13 |
| crclickpress | 106 |
| crclickrelease | 106 |
| createbarmenu | 104 |
| createfontwindow | 21 |
| createimagebuffer | 116 |
| createoptionmenu | 98 |
| creditbox | 75 |
| creditoption | 76 |
| cursorblock | 121 |
| cursorshape | 8 |
| DeallocateExpandedMemoryPages | 17 |
| DEBUGUNT.C | 1 |
| debug_info | 53 |
| defineglobalkeyclickarea | 119 |
| definelocalkeyclickarea | 120 |
| definelongbutton | 58 |
| definemouseclickarea | 119 |
| defineoptionclickarea | 103 |
| defineoptions | 98 |
| delete | 125 |
| deletecapturekey | 7 |
| deskoption | 63 |
| disksize | 132 |
| display | 59 |
| distrib_every | 63 |
| distrib_stud | 63 |
| drawlongbutton | 80 |
| drawmouse | 66 |
| dropimagebuffer | 117 |
| dropkeyclick | 120 |
| dropstackimage | 116 |
| droptimercount | 14 |
| droptimertick | 124 |
| drop_fromlist | 67 |
| drop_from_queue | 54 |
| drop_name | 55 |
| editchar | 50 |
| editstring | 41 |
| ega640×350×16 | 4 |
| EGAGRAPH.C | 2 |
| egagraph_terminateexit | 4 |
| EGAMOUSE.C | 4 |
| egamouse_terminateexit | 13 |
| ega_overlap | 15 |
| EMS.C | 16 |
| emsblockread | 19 |
| emsblockwrite | 19 |
| emsclose | 20 |
| EMSDRIVE.C | 18 |
| EMSPagesAvailable | 17 |
| emsseek | 18 |
| eraser_size | 65 |
| exitoption | 68 |
| exitoption | 78 |
| fgetmem | 24 |
| fileselectionoption | 58 |
| fileselectionoption | 75 |
| fill_str | 25 |
| find_entry | 54 |
| find_in_queue | 54 |
| flipapage | 3 |
| flipvpage | 3 |
| fontname | 20 |
| fontnum | 56 |
| FONTTEST.C | 20 |
| font_select | 64 |
| freefilelist | 41 |

TABLE 2-continued
Alphabetized C routines and Source File Names (in CAPS) Referenced to Microfilm Page Number

| Routine | Page |
|---|---|
| freeimagebuffer | 117 |
| freevirtual | 132 |
| freezemouse | 16 |
| frozenmouse | 15 |
| getbuttonpressinfo | 12 |
| getbuttonreleaseinfo | 12 |
| getfilelist | 40 |
| getfrontimage | 118 |
| getfsimage | 118 |
| GetHandleCountUsed | 17 |
| getkbsteps | 15 |
| getmousesensitivity | 8 |
| getnumberoflogicaldrives | 40 |
| GetPageFrameBaseAddress | 17 |
| GetPagesOwnedByHandle | 18 |
| getpartialimage | 108 |
| GetVersionNumber | 17 |
| HEAPMEM.C | 22 |
| hideimage | 113 |
| hidemouse | 8 |
| infooption | 68 |
| infooption | 78 |
| initheap | 22 |
| initialize | 71 |
| init_egagraph | 4 |
| init_egamouse | 16 |
| init_net | 33 |
| init_table | 37 |
| init_teglunit | 125 |
| insert | 40 |
| insertnewoverlap | 110 |
| interrupt send_int | 31 |
| int_getxy | 35 |
| kbmouse | 9 |
| key | 7 |
| keybrdnextclick | 105 |
| LCCIO.C | 25 |
| LCFLSH.C | 25 |
| LCSETUP.C | 25 |
| lc_getwait | 38 |
| linkfs | 109 |
| linkunderfs | 109 |
| listen_int | 30 |
| listfilenames | 43 |
| listoptionmenu | 99 |
| list_students | 70 |
| load_drawing | 63 |
| main | 71 |
| main | 78 |
| MapExpandedMemoryPages | 17 |
| memoryerrormessage | 124 |
| menumouseposition | 76 |
| mergepartialimage | 112 |
| mouseposition | 9 |
| movebox | 83 |
| moveframe | 115 |
| movefromvirtual | 132 |
| movestackimage | 116 |
| movetovirtual | 133 |
| NETBIOS.C | 25 |
| NETSTUFF.C | 30 |
| Net_Adapter_Status | 26 |
| Net_Add_Group_Name | 26 |
| Net_Add_Name | 26 |
| Net_Call | 27 |
| Net_Cancel | 25 |
| Net_Chain_Receive | 28 |
| Net_Chain_Send | 28 |
| Net_Del_Name | 26 |
| Net_Find_Name | 27 |
| Net_Hang_Up | 27 |
| Net_Identify | 26 |
| Net_Incomplete_Send | 28 |
| Net_Listen | 27 |
| Net_Low_Overhead_Datagram | 29 |
| Net_Presence_Test | 26 |
| Net_Receive | 28 |
| Net_Receive_Any | 28 |
| Net_Receive_Broadcast_Datagrm | 29 |
| Net_Receive_Datagram | 29 |
| Net_Reset | 25 |
| Net_Send | 27 |
| Net_Send_Broadcast_Datagram | 29 |
| Net_Send_Datagram | 29 |
| Net_Status | 28 |
| Net_Trace | 26 |
| new_drawing | 58 |
| outbaroption | 104 |
| outtegltextxy | 126 |
| overlap | 109 |
| overlaparea | 110 |
| overlaps | 16 |
| pageinfs | 108 |
| pageoutfs | 107 |
| pageoutimagestack | 107 |
| pageoutstatus | 107 |
| PEN_ROUT.C | 35 |
| pen_speed | 38 |
| popimage | 112 |
| positionmenu | 97 |
| prepareforpartialupdate | 113 |
| prepareforupdate | 113 |
| preparepartialimage | 112 |
| prepareupdatemsclick | 113 |
| pressbutton | 121 |
| print_name | 54 |
| pushimage | 112 |
| putpartialimage | 108 |
| read_que | 31 |
| read_screen | 59 |
| receive_screen | 32 |
| rec_int | 31 |
| remove_menu | 64 |
| replaceoptiontext | 99 |
| resetkeyclickcallproc | 121 |
| resetmouseclicks | 118 |
| resetmsclickactive | 119 |
| resetmsclickcallproc | 119 |
| resetmsclicksense | 119 |
| resetoptionmenuevents | 103 |
| resettimerflag | 15 |
| resizeoptionmenu | 98 |
| restore_screen | 61 |
| RotateStackImage | 1 |
| rotatestackimage | 114 |
| rotateunderstackimage | 114 |
| save_drawing | 62 |
| save_screen | 60 |
| SELECTFL.C | 39 |
| selectfont | 20 |
| selectmenu | 123 |
| select_icon | 67 |
| send_erase | 32 |
| send_key | 32 |
| send_pt | 32 |
| send_que | 31 |
| send_screen | 32 |
| SENSEMS.C | 47 |
| setapage | 3 |
| setbarbordercolor | 104 |
| setbarborderoff | 104 |
| setbarfillstyle | 104 |
| setbarmenucolor | 104 |
| setbarshadowtext | 105 |
| setbartextcolor | 104 |
| setctrlbreakfs | 124 |
| setframemobility | 116 |
| setgraphicmode | 4 |
| setimagecoordinates | 108 |
| setkbsteps | 15 |
| setkeyboardmouse | 15 |
| setmousecolor | 13 |
| setmousehotspot | 8 |
| setmouseminmax | 15 |
| setmouseposition | 8 |
| setmousesense | 48 |
| setmousesensitivity | 8 |
| setmoveframecallproc | 116 |
| setmoverestrictions | 116 |
| setoptionmenubordercolor | 102 |

TABLE 2-continued

Alphabetized C routines and Source File Names (in CAPS)
Referenced to Microfilm Page Number

| | |
|---|---|
| setoptionmenucolors | 102 |
| setproportional | 125 |
| setshadowbordercolor | 81 |
| setshadowcolor | 81 |
| setshadowfillpattern | 81 |
| setshadowfillstyle | 81 |
| setshadowtexthighlight | 81 |
| setshadowtextshadow | 81 |
| setshadowtexttype | 81 |
| setshiftkeys | 7 |
| setteglbackcolor | 82 |
| setteglbordercolor | 82 |
| setteglbordershow | 82 |
| setteglfillpattern | 82 |
| setteglfillstyle | 82 |
| settimerstart | 14 |
| settimertick | 124 |
| setup_pen_int | 37 |
| setvpage | 3 |
| set_eraser | 65 |
| set_keyboard | 65 |
| set_pen | 38 |
| sgetc | 60 |
| sgetw | 60 |
| shadowbox | 81 |
| shadowboxtext | 82 |
| shadowtext | 81 |
| shadowtexthighlightoff | 81 |
| showbuttonstatus | 1 |
| showcoordinates | 1 |
| showdirectorylist | 44 |
| showfonts | 22 |
| showfreelist | 23 |
| showimage | 114 |
| showmouse | 9 |
| showonefont | 22 |
| SLATE.C | 49 |
| store_drawing | 68 |
| swapcommoff | 39 |
| swapcommon | 39 |
| swapegamouseoff | 14 |
| swapegamouseon | 14 |
| swaptimerin | 14 |
| swaptimerout | 14 |
| switcht | 109 |
| switch_t | 15 |
| TEGL.C | 74 |
| TEGLGRPH.C | 80 |
| TEGLICON.C | 84 |
| teglkeypressed | 8 |
| TEGLMENU.C | 97 |
| teglreadkey | 7 |
| teglsupervisor | 124 |
| tegltextwidth | 126 |
| TEGLUNIT.C | 105 |
| TEGLWRT.C | 125 |
| timerhandler | 13 |
| timerswitch | 14 |
| togglecheckmark | 97 |
| toggleentrystatus | 97 |
| toggleoptionbar | 121 |
| toggle_copy | 57 |
| transformbox | 83 |
| trashevent | 57 |
| trashevent | 77 |
| trashoption | 77 |
| trunc_eraser | 55 |
| unfreezemouse | 16 |
| unlinkfs | 109 |
| unlockimage | 108 |
| unuseimage | 108 |
| update_name | 55 |
| updir | 44 |
| useimage | 108 |
| vdskblockread | 127 |
| vdskblockwrite | 128 |
| vdskcloseheapfile | 130 |
| vdskfreemem | 129 |
| vdskgetmem | 128 |
| vdskreadheapdata | 129 |
| vdskseek | 127 |
| vdskshowfreelist | 127 |
| vdskwriteheapdata | 130 |
| vga640×480×16 | 4 |
| videopage | 3 |
| viewoptiontoggle | 57 |
| viewoptiontoggle | 75 |
| VIRTDSK.C | 127 |
| VIRTMEM.C | 130 |
| visualbuttonpress | 122 |
| wait_ok | 38 |
| within | 55 |
| xorbox | 3 |
| xorcornerbox | 3 |
| zipfrombox | 84 |
| ziptobox | 84 |

TABLE 3

C routines Referenced to Identifiers in FIGS. 3A and 3B
(Where GUI refers to Graphical User Interface System)
Referenced to Microfile Page Number

| | | |
|---|---|---|
| 302 | set_pen | 38 |
| 302 | wait_ok | 38 |
| 307 | comm_gets | 37 |
| 307 | comm_puts | 38 |
| 307 | lc_getwait | 38 |
| 307 | pen_speed | 38 |
| 307 | setup_pen_int | 37 |
| 308 | int_getxy | 35 |
| 310 | adjust_name | 25 |
| 310 | check_phys | 25 |
| 311 | addto_sessionlist | 30 |
| 311 | interrupt send_int | 31 |
| 311 | Net_Chain_Receive | 28 |
| 311 | Net_Chain_Send | 28 |
| 311 | Net_Low_Overhead_Datagram | 29 |
| 311 | Net_Receive | 28 |
| 311 | Net_Receive_Any | 28 |
| 311 | Net_Receive_Broadcast_Datagrm | 29 |
| 311 | Net_Receive_Datagram | 29 |
| 311 | Net_Send | 27 |
| 311 | Net_Send_Broadcast_Datagram | 29 |
| 311 | Net_Send_Datagram | 29 |
| 311 | read_que | 31 |
| 311 | receive_screen | 32 |
| 311 | rec_int | 31 |
| 313 | baroptionmenu | 102 |
| 313 | calibrate | 66 |
| 313 | calibrate_left | 38 |
| 313 | calibrate_right | 39 |
| 313 | createbarmenu | 104 |
| 313 | createoptionmenu | 98 |
| 313 | defineglobalkeyclickarea | 119 |
| 313 | definelocalkeyclickarea | 120 |
| 313 | definemouseclickarea | 119 |
| 313 | defineoptionclickarea | 103 |
| 313 | defineoptions | 98 |
| 313 | ega640×350×16 | 4 |
| 313 | getmousesensitivity | 8 |
| 313 | initialize | 71 |
| 313 | init_egagraph | 4 |
| 313 | init_egamouse | 16 |
| 313 | init_teglunit | 125 |
| 313 | kbmouse | 9 |
| 313 | outbaroption | 104 |
| 313 | positionmenu | 97 |
| 313 | resizeoptionmenu | 98 |
| 313 | setapage | 3 |
| 313 | setbarbordercolor | 104 |
| 313 | setbarborderoff | 104 |
| 313 | setbarfillstyle | 104 |
| 313 | setbarmenucolor | 104 |
| 313 | setbarshadowtext | 105 |
| 313 | setbartextcolor | 104 |
| 313 | setgraphicmode | 4 |
| 313 | setmousesensitivity | 8 |
| 313 | setoptionmenubordercolor | 102 |

TABLE 3-continued

C routines Referenced to Identifiers in FIGS. 3A and 3B
(Where GUI refers to Graphical User Interface System)
Referenced to Microfile Page Number

| Identifier | Page |
|---|---|
| 313 setoptionmenucolors | 102 |
| 313 setvpage | 3 |
| 313 swapcommoff | 39 |
| 313 swapcommon | 39 |
| 313 togglecheckmark | 97 |
| 313 toggleoptionbar | 121 |
| 313 vga640×480×16 | 4 |
| 314 teglsupervisor | 124 |
| 316 clearbuttoninfo | 12 |
| 316 crclickpress | 106 |
| 316 crclickrelease | 106 |
| 316 getbuttonpressinfo | 12 |
| 316 getbuttonreleaseinfo | 12 |
| 316 keybrdnextclick | 105 |
| 316 showbuttonstatus | 1 |
| 318 drawmouse | 66 |
| 318 editchar | 50 |
| 318 xorbox | 3 |
| 318 xorcornerbox | 3 |
| 321 viewoptiontoggle | 57 |
| 322 clear_pad | 68 |
| 322 click_student | 33 |
| 322 close_drawing | 68 |
| 322 display | 59 |
| 322 eraser_size | 65 |
| 322 list_students | 70 |
| 322 load_drawing | 63 |
| 322 movebox | 83 |
| 322 Net_Add_Group_Name | 26 |
| 322 Net_Add_Name | 26 |
| 322 Net_Del_Name | 26 |
| 322 Net_Find_Name | 27 |
| 322 Net_Hang_Up | 27 |
| 322 new_drawing | 58 |
| 322 restore_screen | 61 |
| 322 RotateStackImage | 1 |
| 322 save_drawing | 62 |
| 322 save_screen | 60 |
| 322 set_eraser | 65 |
| 322 set_keyboard | 65 |
| 322 store_drawing | 68 |
| 322 toggleentrystatus | 97 |
| 322 transformbox | 83 |
| 322 zipfrombox | 84 |
| 322 ziptobox | 84 |
| 332 add_to_drawlist | 67 |
| 332 add_to_queue | 53 |
| 332 askforhelp | 57 |
| 332 drop_fromlist | 67 |
| 332 drop_from_queue | 54 |
| 332 drop_name | 55 |
| 332 listen_int | 30 |
| 332 Net_Listen | 27 |
| 332 update_name | 55 |
| 333 listen_int | 30 |
| 333 Net_Listen | 27 |
| 335 send_erase | 32 |
| 335 send_key | 32 |
| 335 send_pt | 32 |
| 335 send_que | 31 |
| 335 send_screen | 32 |
| 336 interrupt send_int | 31 |
| 337 distrib_every | 63 |
| 337 distrib_stud | 63 |
| 337 fill_str | 25 |
| 337 Net_Chain_Receive | 28 |
| 337 Net_Chain_Send | 28 |
| 337 Net_Incomplete_Send | 28 |
| 337 Net_Low_Overhead_Datagram | 29 |
| 337 Net_Receive | 28 |
| 337 Net_Receive_Broadcast_Datagrm | 29 |
| 337 Net_Receive_Datagram | 29 |
| 337 Net_Reset | 25 |
| 337 Net_Send | 27 |
| 337 Net_Send_Broadcast_Datagram | 29 |
| 337 Net_Send_Datagram | 29 |
| 337 receive_screen | 32 |
| 337 rec_int | 31 |
| GUI abortdiskerror | 125 |
| GUI addcapturekey | 7 |
| GUI AllocateExpandedMemoryPages | 17 |
| GUI askmousesense | 76 |
| GUI calldosexec | 76 |
| GUI cfreemem | 24 |
| GUI cgetmem | 22 |
| GUI checkctrlbreak | 123 |
| GUI checkparameters | 13 |
| GUI checksum | 127 |
| GUI clearkeyboardbuf | 118 |
| GUI clearteglscreen | 82 |
| GUI clockupdate1 | 74 |
| GUI clockupdate2 | 74 |
| GUI closefontwindow | 20 |
| GUI cmaxavail | 23 |
| GUI commitimageupdate | 113 |
| GUI commitimageupdate | 117 |
| GUI commitupdate | 113 |
| GUI controlbreakhandler | 13 |
| GUI createfontwindow | 21 |
| GUI createimagebuffer | 116 |
| GUI creditbox | 75 |
| GUI creditoption | 76 |
| GUI cursorblock | 121 |
| GUI cursorshape | 8 |
| GUI DeallocateExpandedMemoryPages | 17 |
| GUI delete | 125 |
| GUI deletecapturekey | 7 |
| GUI disksize | 132 |
| GUI drawlongbutton | 80 |
| GUI dropimagebuffer | 117 |
| GUI dropkeyclick | 120 |
| GUI dropstackimage | 116 |
| GUI droptimercount | 14 |
| GUI droptimertick | 124 |
| GUI egamouse_terminateexit | 13 |
| GUI ega_overlap | 15 |
| GUI emsblockread | 19 |
| GUI emsblockwrite | 19 |
| GUI emsclose | 20 |
| GUI EMSPagesAvailable | 17 |
| GUI emsseek | 18 |
| GUI eplaceoptiontext | 99 |
| GUI etteglbordershow | 82 |
| GUI exitoption | 78 |
| GUI fgetmem | 24 |
| GUI fileselectionoption | 75 |
| GUI fontname | 20 |
| GUI freeimagebuffer | 117 |
| GUI freevirtual | 132 |
| GUI freezemouse | 16 |
| GUI frozenmouse | 15 |
| GUI getfrontimage | 118 |
| GUI getfsimage | 118 |
| GUI GetHandleCountUsed | 17 |
| GUI getkbsteps | 15 |
| GUI GetPageFrameBaseAddress | 17 |
| GUI GetPagesOwnedByHandle | 18 |
| GUI getpartialimage | 108 |
| GUI GetVersionNumber | 17 |
| GUI hideimage | 113 |
| GUI hidemouse | 8 |
| GUI infooption | 78 |
| GUI initheap | 22 |
| GUI insertnewoverlap | 110 |
| GUI linkfs | 109 |
| GUI linkunderfs | 109 |
| GUI listoptionmenu | 99 |
| GUI main | 78 |
| GUI MapExpandedMemoryPages | 17 |
| GUI memoryerrormessage | 124 |
| GUI menumouseposition | 76 |
| GUI mergepartialimage | 112 |
| GUI mouseposition | 9 |
| GUI moveframe | 115 |
| GUI movefromvirtual | 132 |
| GUI movestackimage | 116 |
| GUI movetovirtual | 133 |
| GUI outtegltextxy | 126 |

TABLE 3-continued

C routines Referenced to Identifiers in FIGS. 3A and 3B
(Where GUI refers to Graphical User Interface System)
Referenced to Microfile Page Number

| Routine | Page |
|---|---|
| GUI overlap | 109 |
| GUI overlaparea | 110 |
| GUI overlaps | 16 |
| GUI pageinfs | 108 |
| GUI pageoutfs | 107 |
| GUI pageoutimagestack | 07 |
| GUI pageoutstatus | 107 |
| GUI popimage | 112 |
| GUI prepareforpartialupdate | 113 |
| GUI prepareforupdate | 113 |
| GUI preparepartialimage | 112 |
| GUI prepareupdatemsclick | 113 |
| GUI pressbutton | 121 |
| GUI pushimage | 112 |
| GUI putpartialimage | 108 |
| GUI resetkeyclickcallproc | 121 |
| GUI resetmouseclicks | 118 |
| GUI resetmsclickactive | 119 |
| GUI resetmsclickcallproc | 119 |
| GUI resetmsclicksense | 119 |
| GUI resetoptionmenuevents | 103 |
| GUI resettimerflag | 15 |
| GUI rotatestackimage | 114 |
| GUI rotateunderstackimage | 114 |
| GUI selectfont | 20 |
| GUI selectmenu | 123 |
| GUI setctrlbreakfs | 124 |
| GUI setframemobility | 116 |
| GUI setimagecoordinates | 108 |
| GUI setkbsteps | 15 |
| GUI setkeyboardmouse | 15 |
| GUI setmousecolor | 13 |
| GUI setmousehotspot | 8 |
| GUI setmouseminmax | 15 |
| GUI setmouseposition | 8 |
| GUI setmoveframecallproc | 116 |
| GUI setmoverestrictions | 116 |
| GUI setproportional | 125 |
| GUI setshadowbordercolor | 81 |
| GUI setshadowcolor | 81 |
| GUI setshadowfillpattern | 81 |
| GUI setshadowfillstyle | 81 |
| GUI setshadowtextshadow | 81 |
| GUI setshadowtexttype | 81 |
| GUI setshiftkeys | 7 |
| GUI setteglbackcolor | 82 |
| GUI setteglbordercolor | 82 |
| GUI setteglfillpattern | 82 |
| GUI setteglfillstyle | 82 |
| GUI settimerstart | 14 |
| GUI settimertick | 124 |
| GUI shadowbox | 81 |
| GUI shadowboxtext | 82 |
| GUI shadowtext | 81 |
| GUI shadowtexthighlight | 81 |
| GUI shadowtexthighlightoff | 81 |
| GUI showfonts | 22 |
| GUI showfreelist | 23 |
| GUI showimage | 114 |
| GUI showmouse | 9 |
| GUI showonefont | 22 |
| GUI swapegamouseoff | 14 |
| GUI swapegamouseon | 14 |
| GUI swaptimerin | 14 |
| GUI swaptimerout | 14 |
| GUI switcht | 109 |
| GUI switch_t | 15 |
| GUI teglkeypressed | 8 |
| GUI teglreadkey | 7 |
| GUI tegltextwidth | 126 |
| GUI timerhandler | 13 |
| GUI timerswitch | 14 |
| GUI trashevent | 77 |
| GUI trashoption | 77 |
| GUI unfreezemouse | 16 |
| GUI unlinkfs | 109 |
| GUI unlockimage | 108 |
| GUI unuseimage | 108 |
| GUI useimage | 108 |
| GUI vdskblockread | 127 |
| GUI vdskblockwrite | 128 |
| GUI vdskcloseheapfile | 130 |
| GUI vdskfreemem | 129 |
| GUI vdskgetmem | 128 |
| GUI vdskreadheapdata | 129 |
| GUI vdskseek | 127 |
| GUI vdskshowfreelist | 127 |
| GUI vdskwriteheapdata | 130 |
| GUI viewoptiontoggle | 75 |
| GUI visualbuttonpress | 122 |

What I claim is:

1. A computer assisted electronic educational information communication system, comprising:
   at least two stations;
   at least two monitor means, one associated with each of said stations, for displaying electronic educational information in visual form;
   at least two input means, one associated with each of said stations, for simultaneously and concurrently entering said information in handwritten freehand form from each of said stations and to display on at least its associated monitor means; and
   communication means for virtually simultaneously and concurrently transmitting said information being entered simultaneously and concurrently at either of said input means from either station to other station, and for enabling the virtually simultaneous and concurrent display of said transmitted information on both of said monitor means associated with both of said stations such that said information being entered at a first input means simultaneously and concurrently appears on all of said monitor means while under the independent control of said first input means.

2. The system of claim 1, wherein one of said stations is adapted for an instructor and the other of said stations are adapted for students.

3. The system of claim 2, wherein said instructor's station has more than one of said monitor means.

4. The system of claim 2, wherein said communication means selectively affords said instructor's station to selectively view said information displayed at said monitor means on any of said student's stations virtually simultaneously and concurrently to the time said information is being handwritten at said student's stations.

5. The system of claim 4, wherein said instructor's station's monitor means is selectively controlled by the user implementing icons on said monitor.

6. The system of claim 2, wherein said communication means selectively affords said instructor's station to virtually simultaneously and concurrently transmit said information being handwritten at said instructor's station to all of said monitor means at all of said students' stations.

7. The system of claim 1, wherein said communication means includes a communication network, and further includes a central processing unit and bus interface, located at each of said stations, which is in data communication with said communication network.

8. The system of claim 1, wherein at least one of said input means includes a hand-held stylus for inputting free-style handwritten text and drawings.

9. The system of claim 8, wherein said stations include more than two remotely-located stations, and wherein said input means include more than two input means for simultaneously and concurrently entering said handwritten information in freehand form from said more than two stations.

10. The system of claim 1, wherein said communication means includes means for transmitting one pixel of said information being entered simultaneously and concurrently at either of said input means from either station to the other station on a pixel-by-pixel basis from alternating stations.

11. The system of claim 1, wherein said communication means includes means for enabling the display of one pixel of said information being entered simultaneously and concurrently at either of said input means from either station to the other station on a pixel-by-pixel basis from alternating stations.

12. The system of claim 1, wherein said communication means includes means for queuing said information being simultaneously and concurrently transmitted from either station to the other station.

13. A computer assisted educational information communication system, comprising:
at least two stations, each of said stations having:
at least one monitor having a display surface on which an image appears;
input means for inputting educational information in graphical form into said monitor by a user drawing or writing directly on said display surface;
peripheral interface means for simultaneously and concurrently accepting said information from said input means and for simultaneously and concurrently providing image information to said monitor; and
central processing unit means for controlling said peripheral interface means; and
communication network means for simultaneously and concurrently communicating said information in real time between the peripheral interface means of each of said stations in order to virtually simultaneously and concurrently display the information being input independently and simultaneously and concurrently by said input means at either of said stations such that said image information is simultaneously and concurrently displayed on the monitors of all of said stations and such that each user has independent control of that portion of the image information drawn or written by that user.

14. The system of claim 13, wherein said stations are comprised of more than two stations, and wherein the same image information is virtually simultaneously and concurrently displayed on said monitors of said stations as it is being simultaneously and concurrently input at any of said stations.

15. The system of claim 13, wherein one of said stations is adapted for an instructor and the other of said stations is adapted for students.

16. The system of claim 15, wherein said instructor's station selectively, simultaneously and concurrently controls the display of the information on said monitors of said student's station.

17. The system of claim 13, wherein said input means is comprised of a user controlled hand-held stylus, stylus sensor, and stylus interface means for communicating handwritten or hand-drawn information from said stylus sensor to said peripheral interface means.

18. The system of claim 17, wherein said handwritten or hand-drawn information inputted via said input means is selectively, simultaneously and concurrently displayed on said monitors of any of said stations.

19. The system of claim 13, wherein at least one of said stations further comprises a printer in data communication with said peripheral interface means.

20. The system of claim 13, wherein said peripheral interface means further comprises a bus interface means for communication with said central processing unit means and said communication network means.

21. The system of claim 13, wherein input means includes a keyboard.

22. The system of claim 13, wherein input means includes an optical scanning device.

23. The system of claim 13, wherein said communication network means includes means for simultaneously and concurrently communicating one pixel of said information in real time between the peripheral interface means of said stations on an alternating-station pixel-by-pixel basis during the time the information is being entered simultaneously and concurrently at all of said stations.

24. An instructional information system for use in an education classroom, said system comprising:
at least two remotely-located user stations in which one of said stations is an instructor station and the other of said stations are student stations, said instructor station including means for controlling said instructional information system;
interactive monitor means, located in each of said stations, for simultaneously and concurrently displaying instructional information to the user of that station and for simultaneously and concurrently accepting handwritten instructional information inputted from the user of that station; and
network communication means, connected to each of said stations, for simultaneously and concurrently communicating said inputted and displayed instructional information between said interactive monitor means of all of said stations, said network communication means controlled by said instructor station controlling means to selectively and simultaneously and concurrently display instructional information input and displayed at said instructor's station on said interactive monitor means of any of said student stations virtually simultaneously and concurrently and without interfering with the control of inputted instructional information being accepted from the user of that student station.

25. The system of claim 24, wherein said interactive monitor means utilizes a user controlled freehand writing stylus, the position of which is sensed by a stylus sensor to recognize spacial movement by the user controlled stylus to provide the inputted instructional information from extemporaneous freehand writing or drawing by the user.

26. The system of claim 25, wherein each of said user stations includes a central processing unit and memory means for storing said instructional information, and wherein said network communication means communicates in real time with said central processing units and memory means in each of said stations.

27. The system of claim 24, wherein said instructor station controlling means may selectively and simultaneously and concurrently control the display of said instructional information input at said instructor station on said interactive monitor means of any of said student stations.

28. The system of claim 24, wherein said simultaneous and concurrent visual display of and input acceptance of said instructional information by said interactive monitor means simulates an electronic sheet of paper which is simultaneously and concurrently communicated and interactively shared in real time between the user at said instruction station and student stations.

29. The system of claim 24, wherein said network communication means includes means for communicating said inputted and displayed instructional information between said interactive monitor means of all user stations in a pixel-by-pixel format, and for queuing each pixel of said instructional said instructional information at each station during the time information is being simultaneously and concurrently transmitted from either station to the other station.

30. A method for providing educational information from a first station to a second remotely-located station of a computer assisted communication system, each of said first and second stations having an input device for directly inputting hand-drawn graphical educational information from a user of that station, and having a display monitor for displaying an image of said graphical educational information to the user of that station, the communication system including a computer network for virtually simultaneously and concurrently transferring said graphical educational information between said first and second stations as it is being input, the method comprising the steps of:
 inputting primary hand-drawn graphical educational information into said system by a user at said first station;
 simultaneously and concurrently displaying an image of said primary information to the user of said first station as it is being input by the user of said first station;
 simultaneously and concurrently transferring said primary information from said first station to said second station over said computer network;
 simultaneously and concurrently displaying an image of said primary information to the user of said second station at virtually the same time as it is being input by the user of said first station;
 simultaneously and concurrently inputting secondary hand-drawn graphical information into said system by a user at said second station as said primary information is being input into said system by the user of said first station;
 simultaneously and concurrently transferring said secondary information from said second station to said first station over said computer network; and
 simultaneously and concurrently displaying an image of said secondary information to the user of said first station along with said displayed image of said primary information as said secondary information is being input by the user of said second station and with independent control of that portion of the primary or secondary information being input.

31. The method according to claim 30, wherein said computer assisted communication system further includes a third remotely-location station, and wherein the method further comprises the step of simultaneously and concurrently displaying said image of said primary information to the user of said third station as it is being input by user of said first station.

32. The method according to claim 31, further comprising the step of simultaneously and concurrently selecting between said first, second and third stations before transferring said primary information.

33. The method according to claim 32, wherein said selecting step includes the step of implementing icons on said display monitor.

34. The method according to claim 30, wherein said input device includes a user-controlled freehand writing stylus which simulates to the user the ability to write on said display monitor, and wherein the method further comprises the step of sensing the position of said stylus on said display monitor to recognize spacial movement directed by the user, thereby providing the hand-drawn graphical information into the system.

35. The method according to claim 34, wherein said primary and secondary information inputting, displaying, and transferring steps are performed on a pixel-by-pixel basis.

36. The method according to claim 30, wherein said inputting, displaying, and transferring steps simulate to the users of said first and second stations that the users are simultaneously and concurrently sharing the same display image.

37. The method according to claim 30, wherein said displaying steps include the step of combining images of said primary and second information to be displayed on a single display monitor.

38. The method according to claim 30, wherein the method further comprises the step of simultaneously and concurrently storing said primary information from said first station in said second station when said secondary information is being input into said system by said user at said second station.

39. The method according to claim 30, wherein said primary and secondary information, displaying, and transferring steps are performed on a pixel-by-pixel basis.

* * * * *